(12) United States Patent
Sasaki et al.

(10) Patent No.: US 10,442,141 B2
(45) Date of Patent: Oct. 15, 2019

(54) STEREOSCOPIC MODELING APPARATUS AND STEREOSCOPIC MODELING METHOD

(71) Applicants: Takafumi Sasaki, Kanagawa (JP); Takeo Yamaguchi, Kanagawa (JP)

(72) Inventors: Takafumi Sasaki, Kanagawa (JP); Takeo Yamaguchi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 789 days.

(21) Appl. No.: 14/995,258

(22) Filed: Jan. 14, 2016

(65) Prior Publication Data
US 2016/0243765 A1    Aug. 25, 2016

(30) Foreign Application Priority Data

Feb. 20, 2015 (JP) .................. 2015-031329
Mar. 27, 2015 (JP) .................. 2015-067405

(51) Int. Cl.
| | | |
|---|---|---|
| B22F 3/00 | (2006.01) | |
| B29C 67/00 | (2017.01) | |
| B33Y 10/00 | (2015.01) | |
| B33Y 30/00 | (2015.01) | |
| B29C 64/165 | (2017.01) | |
| B29K 105/00 | (2006.01) | |

(52) U.S. Cl.
CPC .......... B29C 67/0081 (2013.01); B22F 3/008 (2013.01); B29C 64/165 (2017.08); B33Y 10/00 (2014.12); B33Y 30/00 (2014.12); B22F 2999/00 (2013.01); B29K 2105/251 (2013.01)

(58) Field of Classification Search
None
See application file for complete search history.

(56) References Cited

U.S. PATENT DOCUMENTS

2001/0050448 A1    12/2001    Kubo et al.
2015/0343533 A1    12/2015    Park et al.

FOREIGN PATENT DOCUMENTS

JP    2001-334581 A    12/2001
JP    2012-030389    2/2012

OTHER PUBLICATIONS

Japanese Office Action dated Oct. 30, 2018.

Primary Examiner — Colin W. Slifka
(74) Attorney, Agent, or Firm — Harness, Dickey & Pierce, P.L.C.

(57) ABSTRACT

A stereoscopic modeling apparatus is provided. The stereoscopic modeling apparatus includes a modeling tank, a liquid discharger, and a powder supplier. In the modeling tank, a powder layer including a powder is formed and a modeling layer in which the powder in the powder layer is bonded into a required shape is laminated. The liquid discharger discharges a modeling liquid to the powder in the modeling tank. The powder supplier supplies the powder to the modeling tank. The powder supplier supplies the powder to the powder layer while at least a part of the modeling liquid discharged from the liquid discharger and adhered to a surface of the powder layer remains existing on an outermost surface of the powder layer.

9 Claims, 19 Drawing Sheets

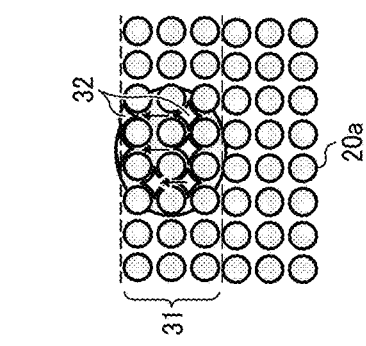
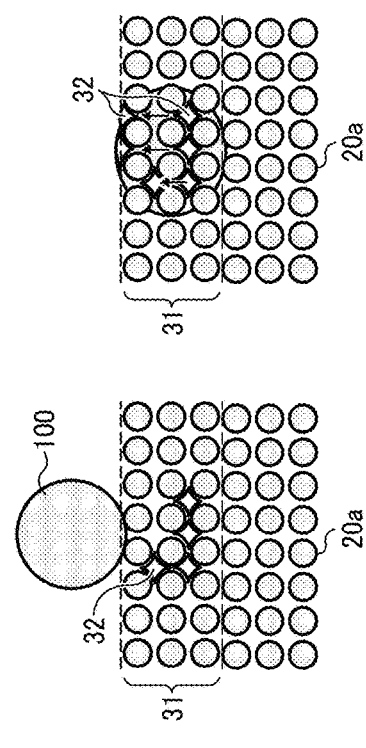
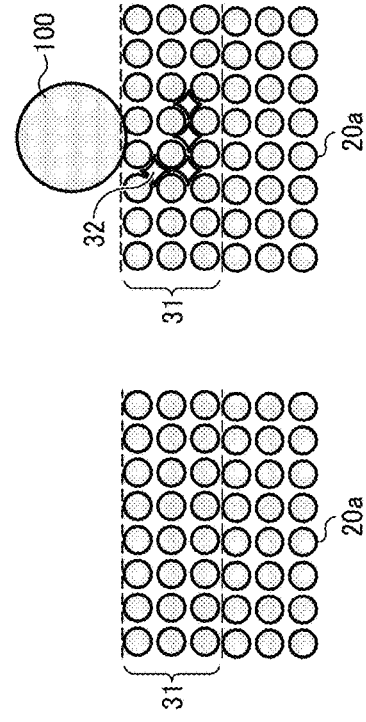
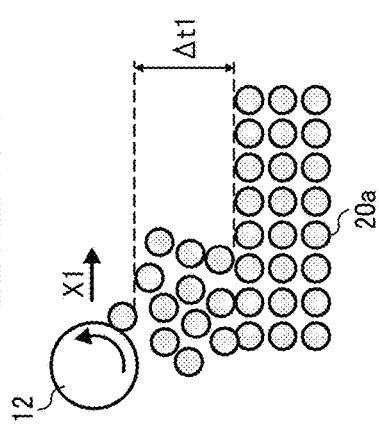
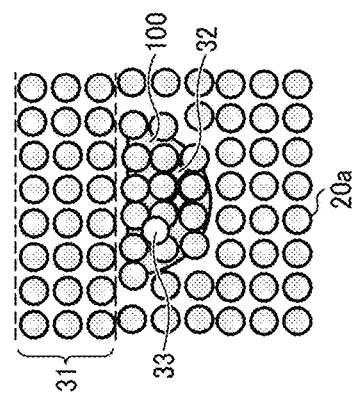
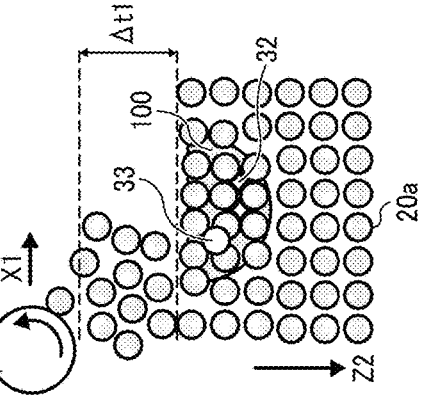
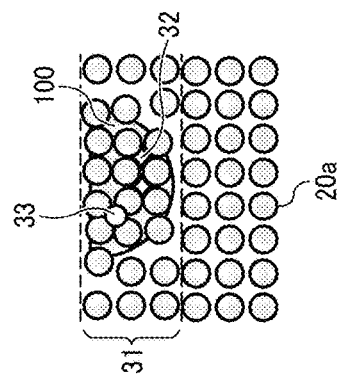
FIG. 8A RELATED ART
FIG. 8B RELATED ART
FIG. 8C RELATED ART
FIG. 8D RELATED ART
FIG. 8E RELATED ART
FIG. 8F RELATED ART
FIG. 8G RELATED ART

STEREOSCOPIC MODELING APPARATUS AND STEREOSCOPIC MODELING METHOD

CROSS-REFERENCE TO RELATED APPLICATIONS

This patent application is based on and claims priority pursuant to 35 U.S.C. § 119(a) to Japanese Patent Application Nos. 2015-031329 and 2015-067405, filed on Feb. 20, 2015 and Mar. 27, 2015, respectively, in the Japan Patent Office, the entire disclosure of each of which is hereby incorporated by reference herein.

BACKGROUND

Technical Field

The present disclosure relates to a stereoscopic modeling apparatus and a stereoscopic modeling method.

Description of the Related Art

As a stereoscopic modeling apparatus (or three-dimensional modeling apparatus) for modeling stereoscopic modeled products (or three-dimensional modeled products), an apparatus employing additive manufacturing is known. Such an apparatus employing additive manufacturing forms a stereoscopic modeled product by laminating modeling layers. One example of the additive manufacturing includes repeating the steps of forming a flattened layer of metal or non-metal powder particles (hereinafter "powder layer") on a modeling stage, discharging a modeling liquid on the powder layer to form a layer in which the powder particles are bonded (hereinafter "modeling layer"), and forming another powder layer again on the modeling layer.

In additive manufacturing, a thin powder layer is generally formed by a leveling mechanism such as a squeegee. Therefore, there is a limit in increasing the powder density of the powder layer. The upper limit of the powder density is generally equivalent to the loose bulk density of the powder.

Upon impact of a droplet of a bonding liquid, the powder particles are caused to migrate due to liquid bridge adhesive force. Thus, dense portions and sparse portions in which the powder density is relatively high and low, respectively, randomly appear. As a result, disadvantageously, the resulting modeled product may locally contain voids, be nonuniform in density, and have poor quality.

SUMMARY

In accordance with some embodiments of the present invention, a stereoscopic modeling apparatus is provided. The stereoscopic modeling apparatus includes a modeling tank, a liquid discharger, and a powder supplier. In the modeling tank, a powder layer including a powder is formed and a modeling layer in which the powder in the powder layer is bonded into a required shape is laminated. The liquid discharger discharges a modeling liquid to the powder in the modeling tank. The powder supplier supplies the powder to the modeling tank. The powder supplier supplies the powder to the powder layer while at least a part of the modeling liquid discharged from the liquid discharger and adhered to a surface of the powder layer remains existing on an outermost surface of the powder layer.

In accordance with some embodiments of the present invention, a stereoscopic modeling method is provided. The method includes the steps of forming a powder layer including a powder; discharging a modeling liquid to the powder layer to form a modeling layer in which the powder in the powder layer is bonded into a required shape; laminating the modeling layer; and supplying the powder to the powder layer while at least a part of the modeling liquid discharged and adhered to a surface of the powder layer remains existing on an outermost surface of the powder layer.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 8A to 8G are illustrations for a process of discharging a modeling liquid to a powder layer and supplying a powder thereto for forming a next powder layer according to a comparative example;

Figure 1:
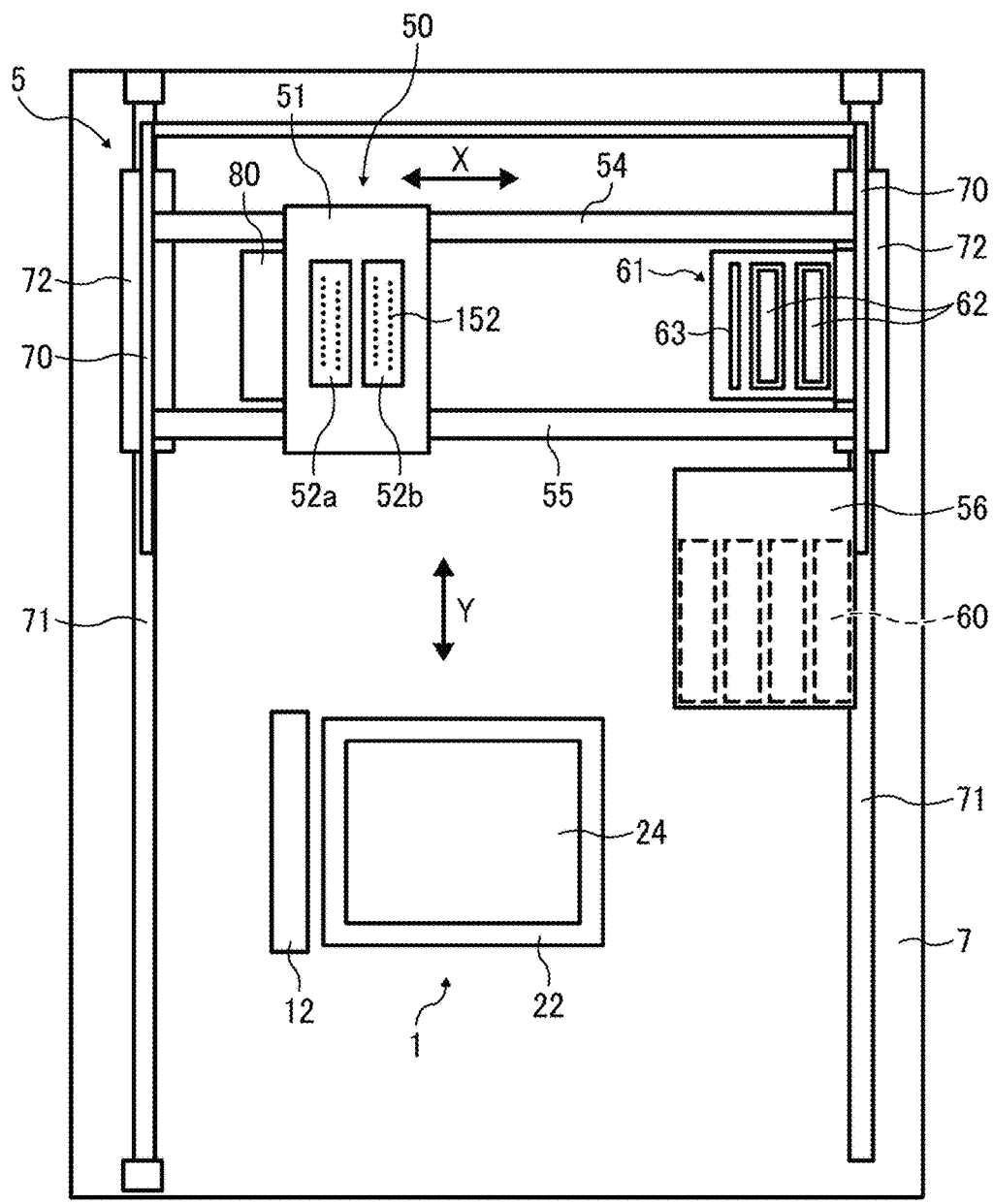
FIG. 1 is a plan view of a stereoscopic modeling apparatus according to an embodiment of the present invention.
Figure 2:
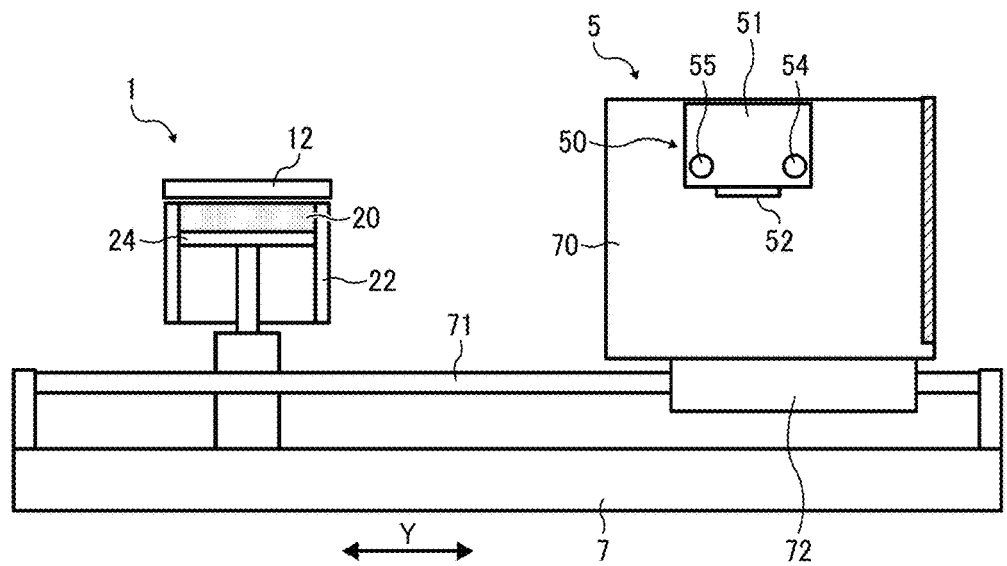
FIG. 2 is a side view of the stereoscopic modeling apparatus.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In accordance with some embodiments of the present invention, a stereoscopic modeled product having an improved quality is provided.

Figure 3:
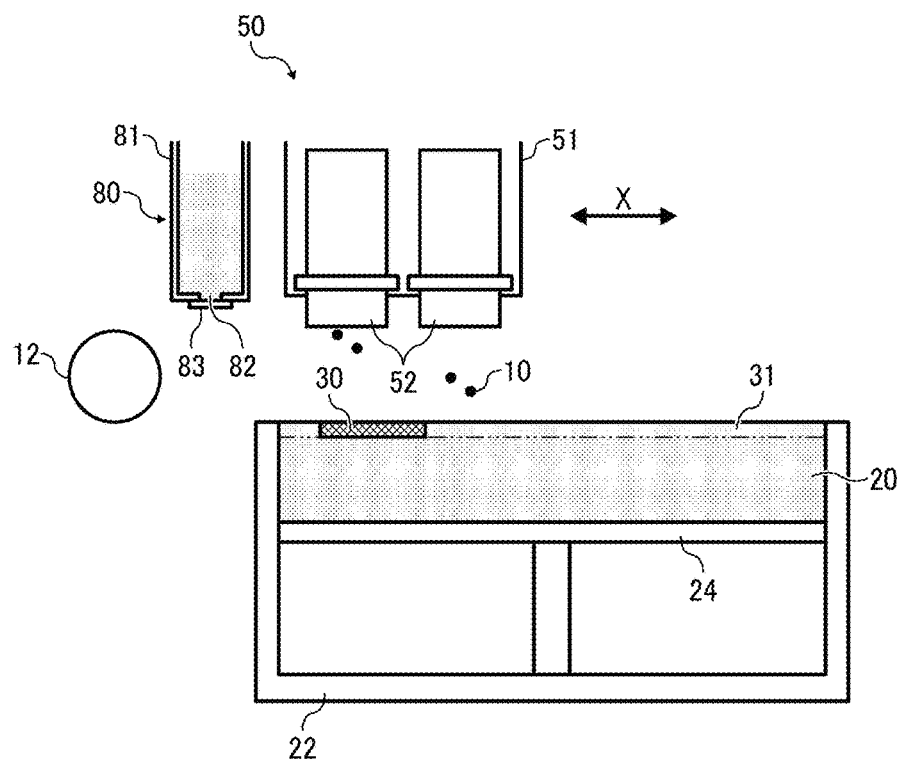
FIG. 3 is an elevation view of the stereoscopic modeling apparatus.
Figure 4:
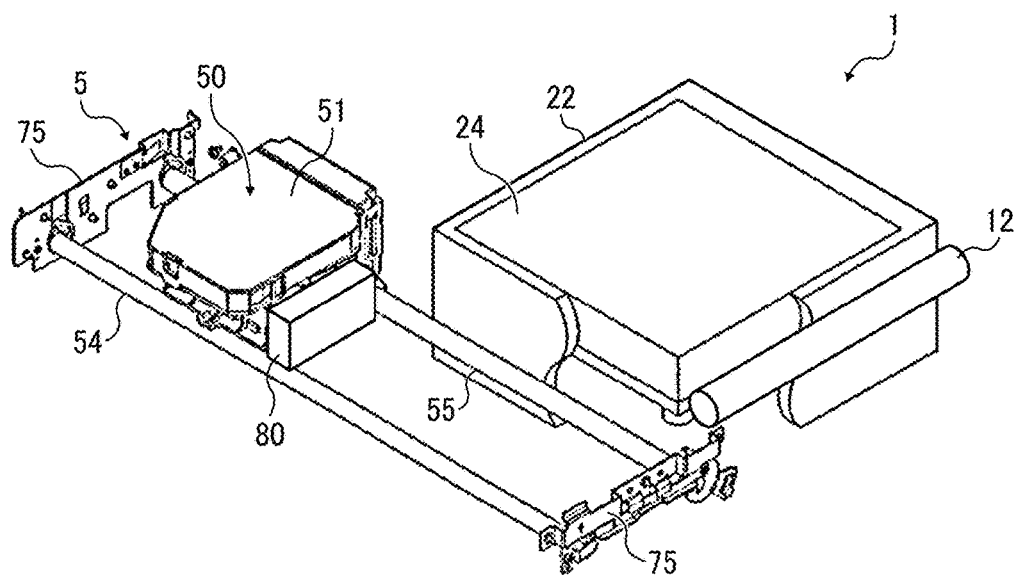
FIG. 4 is a perspective view of the stereoscopic modeling apparatus.

A stereoscopic modeling apparatus in accordance with a first embodiment of the present invention is described below with reference to FIGS. 1 to 4. FIGS. 1, 2, 3, and 4 are plan view, side view, elevation view, and perspective view, respectively, of the stereoscopic modeling apparatus. FIG. 3 illustrates the stereoscopic modeling apparatus in a modeling operation status.

This stereoscopic modeling apparatus is of a powder modeling apparatus. The stereoscopic modeling apparatus includes a modeling part 1 and a modeling unit 5.

In the modeling part 1, a powder layer 31 in which particles of a powder 20 are layered is formed, and then a modeling layer 30 in which the particles of the powder 20 are bonded into a required shape is formed. The modeling unit 5 discharges a modeling liquid 10 to the powder layer 31 spread in the modeling part 1.

The modeling part 1 includes a modeling tank 22 and a flattening roller 12 that is a rotor serving as a flattening member (recoater). In place of the rotor, a platy member (blade) may also be used as the flattening member.

In the modeling tank 22, a plurality of the modeling layers 30 are laminated to model a stereoscopic modeled product. A bottom part of the modeling tank 22 is freely movable up and down in the direction indicated by arrow Z (i.e., height direction) as a modeling stage 24. The stereoscopic modeled product in which the modeling layers 30 are laminated is modeled on the modeling stage 24.

The flattening roller 12 flattens the powder 20 supplied to the modeling tank 22 to form the powder layer 31.

The flattening roller 12 is reciprocatable relative to the surface of the modeling stage 24 in the direction indicated by arrow X along the stage surface of the modeling stage 24 (i.e., a surface on which the powder 20 is to be placed). The flattening roller 12 moves above the modeling tank 22 while rotating.

The modeling unit 5 includes a liquid discharge unit 50 that discharges the modeling liquid 10 to the powder layer 31 on the modeling stage 24.

The liquid discharge unit 50 includes a carriage 51 and two liquid discharge heads (hereinafter simply "heads") 52a and 52b mounted on the carriage 51. The number of the heads is not limited to two, and may be one or three or more. The heads 52a and 52b may be hereinafter collectively referred to as the head 52.

The carriage 51 is moveably supported by guides 54 and 55. The guides 54 and 55 are supported by supports 75 on both ends and held by side plates 70 on both ends to be movable up and down.

The carriage 51 is reciprocatable in the direction indicated by arrow X (hereinafter simply "X direction", the same may be applied to the directions indicated by arrows Y, Z, etc.) that is coincident with the main scanning direction by an X-direction scanning mechanism including a motor, a pulley, and a belt.

Each of the heads 52a and 52b has two nozzle arrays 152 each of which including multiple liquid discharge nozzles, as illustrated in FIG. 1 in a transmissive state. The respective two nozzle arrays on the head 52a discharge a cyan modeling liquid and a magenta modeling liquid. The respective two nozzle arrays on the head 52b discharge a yellow modeling liquid and a black modeling liquid. The structures of the heads and the colors of the modeling liquids are not limited to those described above.

Multiple tanks 60 each storing the cyan modeling liquid, the magenta modeling liquid, the yellow modeling liquid, and the black modeling liquid are mounted on a tank mounting unit 56. The modeling liquids are supplied to the heads 52a and 52b through supply tubes.

A powder supplier 80 that supplies fresh particles of the powder 20 on the powder layer 31 in the modeling tank 22 is mounted on the carriage 51. The powder supplier 80 includes a powder container 81 to store the powder 20, a supply port 82 to supply the powder 20, and a shutter 83 to open and close the supply port 82.

On one end in the X direction, a maintenance mechanism 61 to maintain and recover the head 52 of the liquid discharge unit 50 is provided.

The maintenance mechanism 61 includes a cap 62 and a wiper 63. The cap 62 is brought into intimate contact with the nozzle plate (on which nozzles are formed) of the head 52 to suck the modeling liquids from the nozzles. Thus, powder particles clogging the nozzles and modeling liquids having become highly viscous can be discharged. The surface of the nozzle plate is then wiped with the wiper 63 so as to form a meniscus of the nozzles. (The inside of the nozzle is in a negative pressure state.) In the maintenance mechanism 61, while discharging of the modeling liquid is suspended, the nozzle plate of the head 52 is covered with the cap 62 to prevent intrusion of the powder 20 into the nozzles and drying of the modeling liquid 10.

The modeling unit 5 includes sliders 72 moveably supported by respective guides 71 provided on a base 7. Thus, the modeling unit 5 as a whole is reciprocatable in the Y direction (i.e., sub-scanning direction) that is perpendicular to the X direction (i.e., main scanning direction) by a Y-direction scanning mechanism.

The liquid discharge unit 50, along with the guides 54 and 55, is movable up and down in the Z direction by an elevating mechanism.

Figure 5:
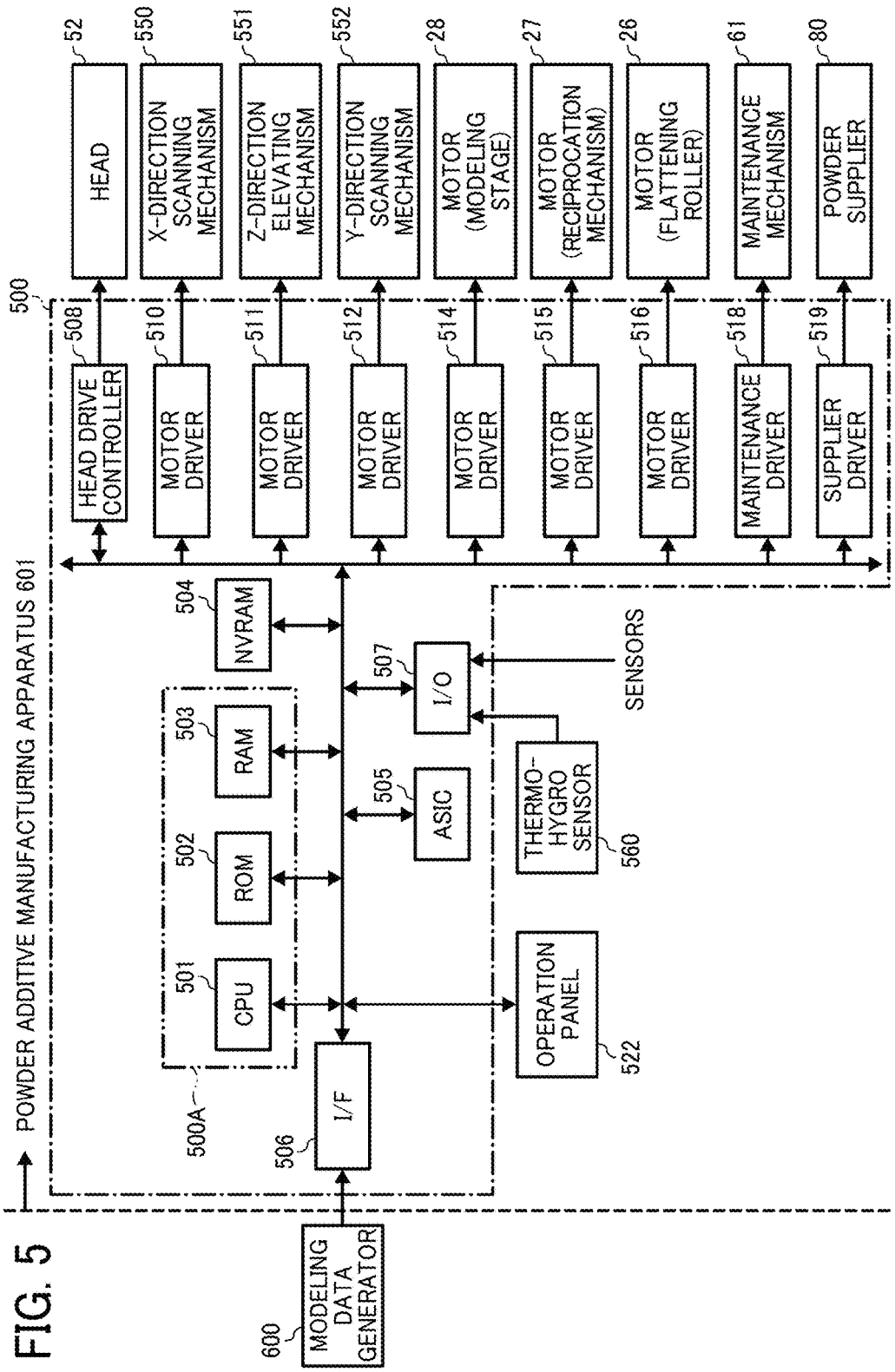
FIG. 5 is a block diagram of a controller of the stereoscopic modeling apparatus.

A controller of the above stereoscopic modeling apparatus is described below with reference to FIG. 5. FIG. 5 is a block diagram of the controller.

A controller 500 includes a main controller 500A including a central processing unit (CPU) 501 to control the overall stereoscopic modeling apparatus, a read only memory (ROM) 502 to store a program which causes the CPU 501 to control a stereoscopic modeling operation in accordance with an embodiment of the present invention and other fixed data, and a random access memory (RAM) 503 to temporarily store modeling data and the like.

The controller 500 includes a non-volatile random access memory (NVRAM) 504 to hold data even when the power to the apparatus is cut off. The controller 500 includes an application specific integrated circuit (ASIC) 505 to execute an image processing which processes various signals corresponding to image data and to process input and output signals for controlling the overall apparatus.

The controller 500 includes an interface (I/F) 506 to transmit and receive data and signals used for receiving modeling data from an external modeling data generator 600. The modeling data generator 600 generates modeling data of the final shape of the modeled product that is sliced into multiple modeling layers. The modeling data generator 600 includes an information processing apparatus such as a personal computer.

The controller 500 includes an input/output device (I/O) 507 to incorporate various sensor detection signals.

The controller 500 includes a head drive controller 508 to drive-control the head 52 of the liquid discharge unit 50.

The controller 500 includes a motor driver 510 to drive a motor of an X-direction scanning mechanism 550 that causes the carriage 51 of the liquid discharge unit 50 to move in the X direction (i.e., main scanning direction), and a motor driver 512 to drive a motor of a Y-direction scanning mechanism 552 that causes the modeling unit 5 to move in the Y direction.

The controller 500 includes a motor driver 511 to drive a motor of a Z-direction elevating mechanism 551 that causes the carriage 51 of the liquid discharge unit 50 to move up and down in the Z direction. According to another embodiment, the modeling unit 5 as a whole may be configured to be movable up and down in the Z direction.

The controller 500 includes a motor driver 514 to drive a motor 28 that causes the modeling stage 24 to move up and down.

The controller 500 includes a motor driver 515 to drive a motor 27 of a reciprocating mechanism 25 that causes the flattening roller 12 to reciprocate, and a motor driver 516 to drive a motor 26 that rotary-drives the flattening roller 12.

The controller 500 includes a maintenance driver 518 to drive the maintenance mechanism 61 of the liquid discharge unit 50.

The controller 500 includes a supplier driver 519 to cause the powder supplier 80 to open the shutter 83 and supply the powder 20.

To the I/O 507 of the controller 500, detection results from a thermo-hygro sensor 560, for detecting temperature and humidity as environmental conditions of the apparatus, and other detection signals from other sensors are input.

The controller 500 is connected to an operation panel 522 for inputting and displaying necessary information for the apparatus.

The stereoscopic modeling apparatus is composed of the modeling data generator 600 and a powder additive manufacturing apparatus 601.

A modeling flow is described below with reference to FIGS. 6A to 6D. FIGS. 6A to 6D are schematic views illustrating a flow of the modeling operation in accordance with an embodiment of the present invention.

Figure 6A:
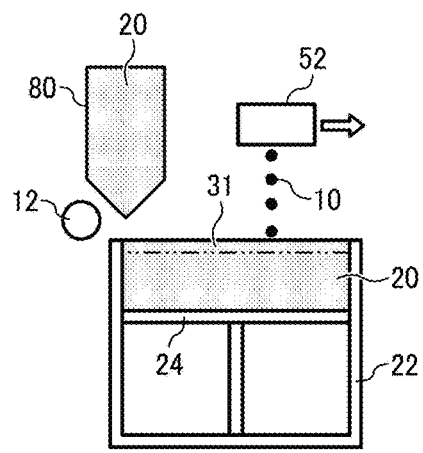
FIGS. 6A to 6D are schematic views illustrating a flow of a modeling operation in accordance with an embodiment of the present invention.
Figure 6B:
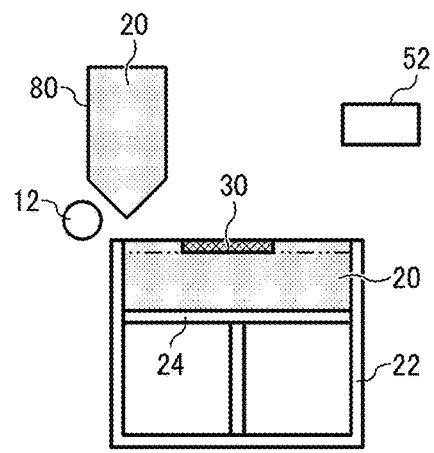

The head 52 discharges the modeling liquid 10 to the powder layer 31 spread on the modeling stage 24 of the modeling tank 22 while moving, as illustrated in FIG. 6A, to form the first modeling layer 30 in a required shape, as illustrated in FIG. 6B.

Figure 6C:
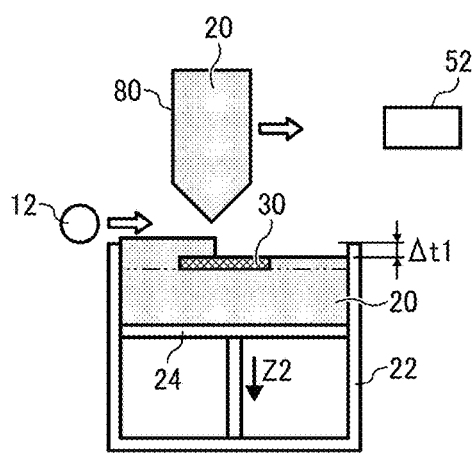

The modeling stage 24 is then lowered in the Z2 direction for a predetermined distance, as illustrated in FIG. 6C. The lowering distance of the modeling stage 24 is so determined that the distance between the surface of the powder layer 31 in the modeling tank 22 and the lower contact-line part of the flattening roller 12 becomes Δt1. The distance Δt1 corresponds to the thickness of a next powder layer 31. Preferably, the distance Δt1 is from several tens to several hundreds of micro-meters.

Figure 6D:
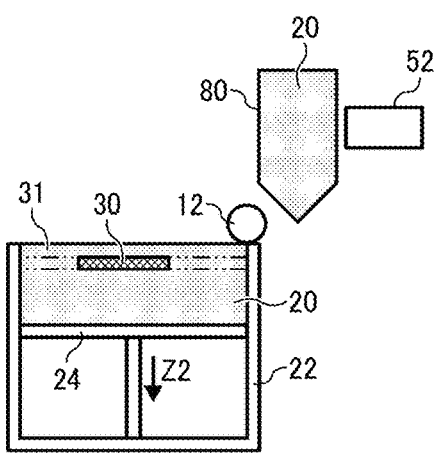

The powder supplier 80 then supplies the powder 20 to the powder layer 31 on which the modeling layer 30 has been formed, and the flattening roller 12 flattens the supplied powder 20 to form a next powder layer 31, as illustrated in FIG. 6D.

In the present embodiment, the modeling layer 30 is formed as the modeling liquid 10 discharged from the head 52 is mixed with the powder 20, an adhesive included in the powder 20 is dissolved, and the dissolved adhesive molecules bond the particles of the powder 20.

The process of forming the powder layer 31 by supplying and flattening the powder 20 and the process of discharging the modeling liquid 10 from the head 52 are repeated to form a new modeling layer. The new modeling layer 30 and the lower modeling layer 30 are integrally combined to compose a part of a three-dimensional modeled product.

The process of forming the powder layer 31 by supplying and flattening the powder 20 and the process of discharging the modeling liquid 10 from the head 52 are further repeated a required number of times to complete formation of the three-dimensional modeled product (stereoscopic modeled product).

Figure 7:
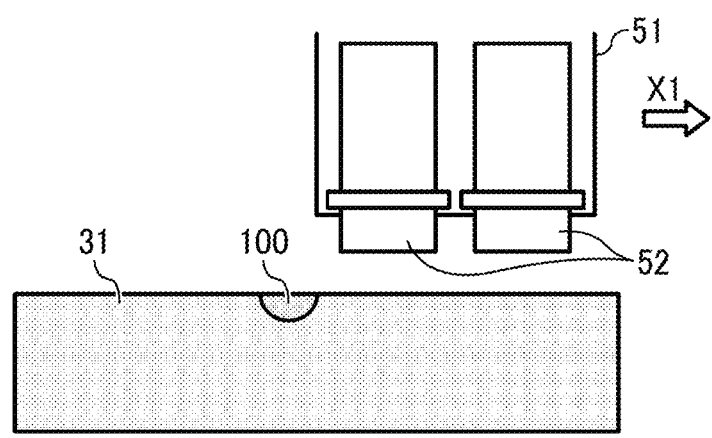
FIG. 7 is an illustration for a situation in which a discharged droplet impacts on a powder layer.

A situation in which a discharged droplet impacts on the powder layer is described below with reference to FIG. 7. FIG. 7 is an illustration for this situation.

FIG. 7 illustrates a situation in which a two-dimensional image data with a pitch of 300×300 dpi (approximately 85 μm) has been generated, a droplet 100 of the modeling liquid has impacted on the powder layer 31 based on the data, and the droplet 100 has permeated the powder layer 31.

The quantity of the droplet 100 is adjusted so that the droplet 100 is just permeable for a depth of 100 μm.

Such a quantity of the droplet 100 can be experimentally determined as follows. First, spread the powder on a glass substrate to form a powder layer having a thickness of 100 μm, and drop a droplet on the powder layer. Observe the glass plate with a camera from the side opposite to the surface on which the droplet is dropped, to determine whether the liquid has permeated the powder layer for a depth of 100 μm. By repeating this experiment while varying the quantity of the droplet, the quantity of the droplet just permeable for a depth of 100 μm can be determined. As a result of the experiment, the quantity of the droplet 100 is adjusted to approximately 200 pl per droplet.

A comparative example of a process of discharging a modeling liquid to a powder layer and supplying a powder thereto for forming a next powder layer is described below with reference to FIGS. 8A to 8G.

In this process according to a comparative example, a modeling liquid is discharged to a powder layer to form one modeling layer, and a powder is supplied after the formation of one modeling layer.

Specifically, the flattening roller 12 flattens the supplied powder 20, as illustrated in FIG. 8A, to form the powder layer 31 having a predetermined thickness of Δt1, as illustrated in FIG. 8B. Here, the powder 20 is a bulk of particles 20a.

At the time of flattening (recoating), the powder layer 31 has a density equivalent to the loose bulk density of the powder 20. This means that the powder layer 31 contains a lot of voids. It should be noted that the particles 20a of the powder 20 are not necessarily aligned in an orderly manner as illustrated in FIGS. 8A to 8G. It should be also noted that the particles 20a of the powder 20 are so illustrated in FIGS. 8A to 8G that they are slightly apart from each other, for making it easy to show that a lot of voids exist. As an example, a gas-atomized powder PSS316L—20 μm grade, having an average particle diameter of 14 μm, available from Sanyo Special Steel Co., Ltd., has a density of only 3 g/cc, which is 37% of the true density.

Next, a droplet 100 of the modeling liquid 10 is discharged to make it impact on (adhere to) the surface of the powder layer 31, as illustrated in FIG. 8C. At this time, the powder layer 31 contains air 32 therein.

The droplet 100 impacted on the surface of the powder layer 31 permeates the powder layer 31, as illustrated in FIG. 8D, and brings the particles 20a of the powder 20 close to each other by liquid bridge adhesive force and allows the bulk of the air 32 coalesces, thereby accelerating movement of the particles 20a of the powder 20. At this time, the powder density at the region where the droplet 100 has permeated becomes equivalent to the tapped density (i.e., 3.6 g/cc, 45%). By contrast, the periphery of that region where the droplet 100 has permeated becomes a sparse region having a relatively low powder density.

A part of the air 32, having been contained in the powder layer 31 before the impact of the droplet 100, is discharged upward from the powder layer 31 by buoyant force, as illustrated in FIG. 8D.

On the other hand, another part of the air 32 having been contained in the powder layer 31 before the impact of the droplet 100 may coalesce into a bubble 33 and remain at the surface of the powder layer 31, as illustrated in FIG. 8E. Since the space between the particles 20a of the powder 20 is fine and complex, the most part of the air 32 contained in the powder layer 31 coalesces into the bubble 33 and remain trapped in the region where the droplet 100 has permeated, as illustrated in FIG. 8E. At this time, at least a part of the bubble 33 or the air 32 continues to exist without collapsing by the viscosity of the modeling liquid 10 (i.e., a binder).

The powder 20 is then supplied and flattened by the flattening roller 12, as illustrated in FIG. 8F, to form a next powder layer 31. At this time, the bubble 33 remains inside or at the boundary of the powder layer 31, as illustrated in FIG. 8G.

Since the bubble 33 exists throughout the resulting stereoscopic modeled product, the density thereof becomes nonuniform and low.

A process of discharging a modeling liquid to a powder layer and supplying a powder thereto for forming a next powder layer, according to an embodiment of the present invention, is described below with reference to FIGS. 9A to 9E.

In this process according to an embodiment of the present invention, a modeling liquid is discharged to a powder layer and a powder for forming a next powder layer is supplied thereto while the modeling liquid is remaining on the powder layer.

Figure 9A:
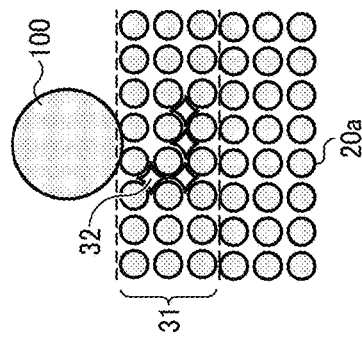
FIGS. 9A to 9E are illustrations for a process of discharging a modeling liquid to a powder layer and supplying a powder thereto for forming a next powder layer according to an embodiment of the present invention.
Figure 9B:
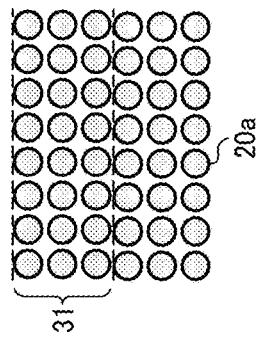

Specifically, the flattening roller 12 flattens the supplied powder 20, as illustrated in FIG. 9A, to form the powder layer 31 having a predetermined thickness of Δt1, as illustrated in FIG. 9B.

At the time of flattening (recoating), the powder layer 31 has a density equivalent to the loose bulk density of the powder 20. This means that the powder layer 31 contains a lot of voids.

Figure 9C:
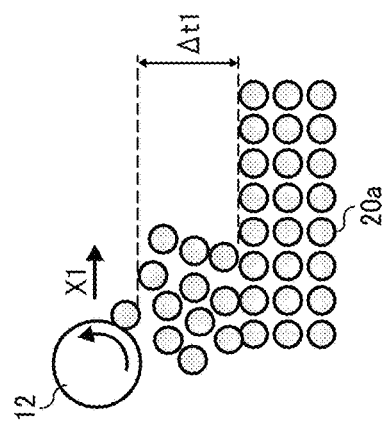

Next, a droplet 100 of the modeling liquid 10 is discharged to make it impact on (adhere to) the surface of the powder layer 31, as illustrated in FIG. 9C. At this time, the powder layer 31 contains air 32 therein.

Figure 9D:
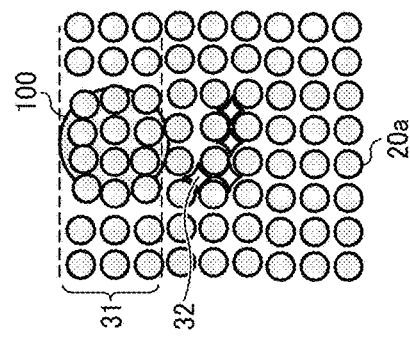

While at least a part of the droplet 100 adhered to the surface of the powder layer 31 remains existing on the outermost surface of the powder layer 31, the powder 20 for forming a next powder layer 31 is supplied, as illustrated in FIG. 9D. For the sake of convenience, FIG. 9D illustrates a situation in which the powder 20 is supplied by the flattening roller 12. Actually, the powder 20 is supplied from the powder supplier 80 that is moving together with the head 52, as described above.

Figure 9E:
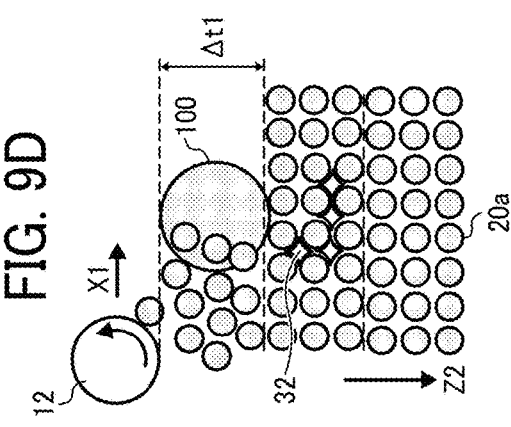

Thus, the powder 20 is supplied before the droplet 100 permeates the powder layer 31. Since the specific gravity of the powder 20 is typically greater than that of the modeling liquid 10, the powder 20 descends to precipitate while being directly incorporated in the droplet 100 of the modeling liquid 10 with generating less intervening air, as illustrated in FIG. 9E.

The particles 20a of the powder 20 present near the region where the droplet 100 has adhered are brought close to each other by liquid bridge adhesive force with generating less intervening air. Therefore, movement or allocation of the air is unlikely to occur.

Thus, while at least a part of the droplet 100 of the modeling liquid 10 discharged from the head 52 and adhered to the surface of the powder layer 31 remains existing on the outermost surface of the powder layer 31, the powder 20 is supplied on the powder layer 31 from the powder supplier 80 by the flattening roller 12. This process provides a modeled product containing less air and having a uniform and high density.

The first embodiment is further described below with reference to FIGS. 10A-10B and 11A-11B. FIGS. 10A-10B and 11A-11B are illustrations for the stereoscopic modeling operation according to the first embodiment.

As described above, the head 52 is mounted on the carriage 51. In addition, the powder supplier 80 is integrally mounted on the carriage 51. The flattening roller 12 flattens the powder 20 in the modeling tank 22 to form the powder layer 31.

The powder supplier 80 and the flattening roller 12 are moved in conjunction with the movement of the carriage 51 (liquid discharge unit 50) at a predetermined speed, i.e., moved along with the carriage 51 at the same speed mechanically or by control, in the X1 direction.

Figure 10A:
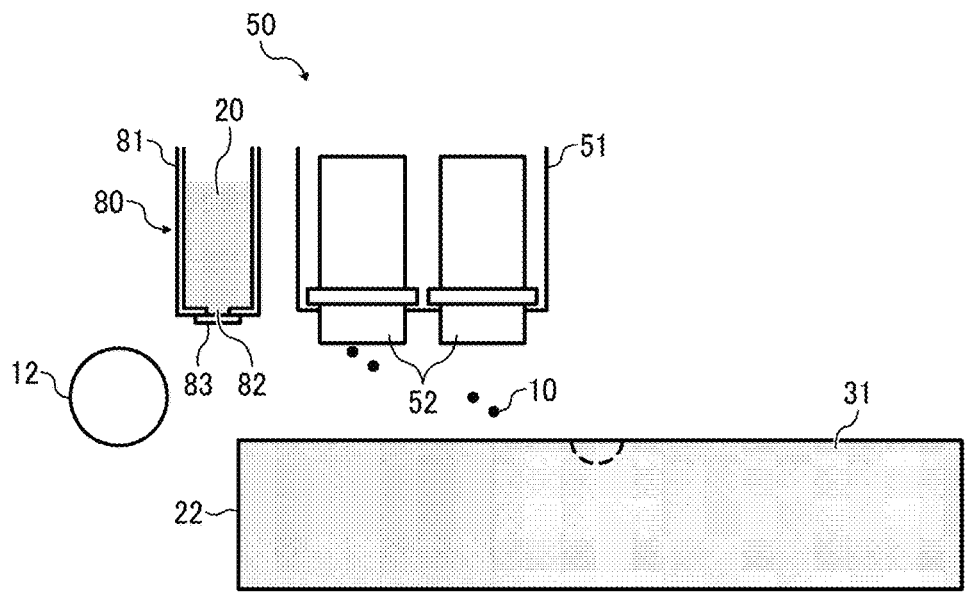
FIGS. 10A and 10B are illustrations for a stereoscopic modeling operation according to an embodiment of the present invention.

When forming the modeling layer 30 having a required shape in the powder layer 31 in the modeling tank 22, the nozzles of the head 52 discharge a predetermined amount of the modeling liquid 10 while the carriage 51 moves in the X1 direction at a predetermined speed, as illustrated in FIG. 10A.

Figure 10B:
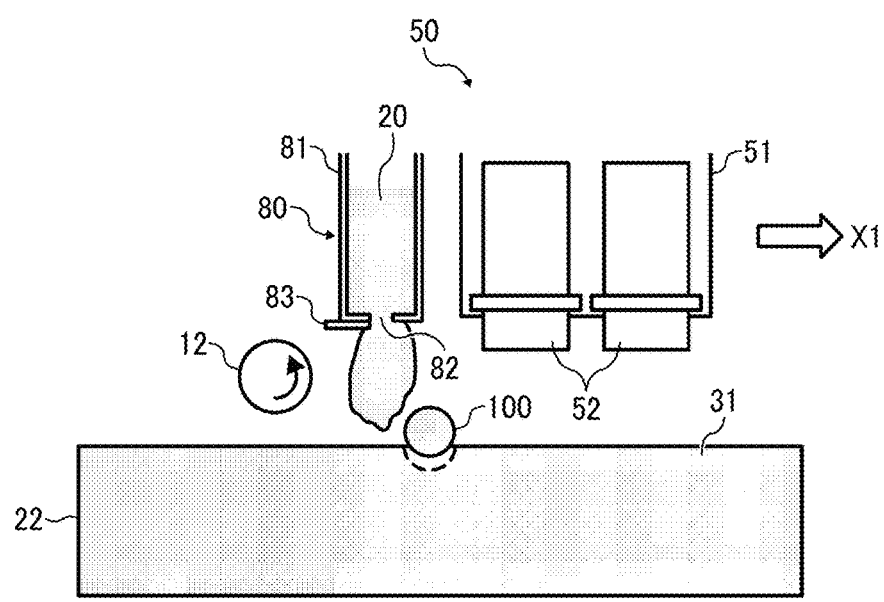

As a result, the droplet 100 of the modeling liquid 10 adheres to a predetermined position on the powder layer 31 based on modeling data, as illustrated in FIG. 10B.

The shutter 83 of the powder supplier 80 is opened at a predetermined position so that the powder 20 is supplied from the supply port 82 onto the powder layer 31, as illustrated in FIG. 10B. The supply amount is adjustable by setting the opening area of the supply port 82 in accordance with the fluidity of the powder 20. Alternatively, the powder supplier 80 may be equipped with a supply amount measuring means.

At this time, the droplet 100 impacted on the surface of the powder layer 31 has not completely permeated the powder layer 31. Namely, supply of the powder 20 is performed while the droplet 100 is existing on the powder layer 31 and before the droplet 100 completely permeates the powder layer 31.

Thus, the supplied powder 20 can conform with the modeling liquid 10 without intervening air to become a part of the modeled product.

Figure 11A:
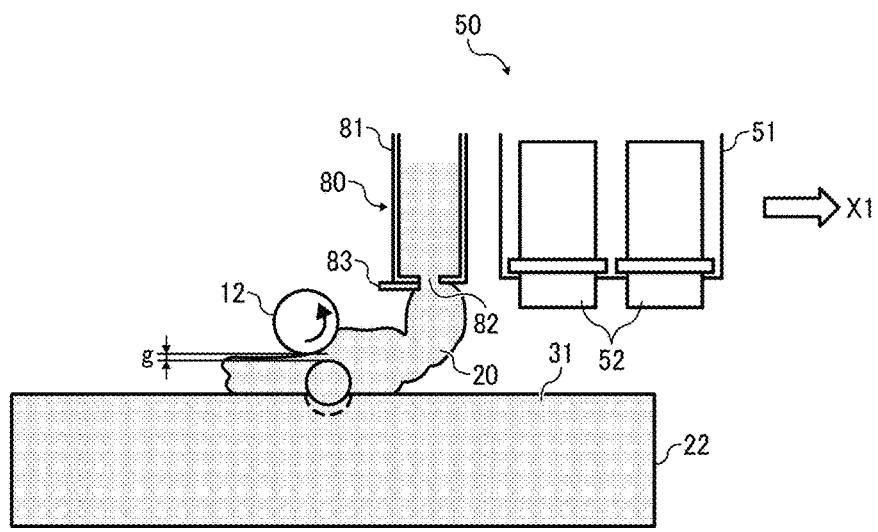
FIGS. 11A and 11B are illustrations for the operation following FIGS. 10A and 10B.

Subsequently, the flattening roller 12 moves on the supplied powder 20 in the X1 direction while rotating in the counter direction relative to the X1 direction, as illustrated in FIG. 11A, to flatten the supplied powder 20.

The height of the flattening roller 12 is so adjusted that the flattening roller 12 can pass slightly above the droplet 100 while forming a gap therebetween. Owing to this adjustment, a modeled product having a high degree of accuracy can be obtained without dragging the modeling layer 30b by the flattening roller 12.

Figure 11B:
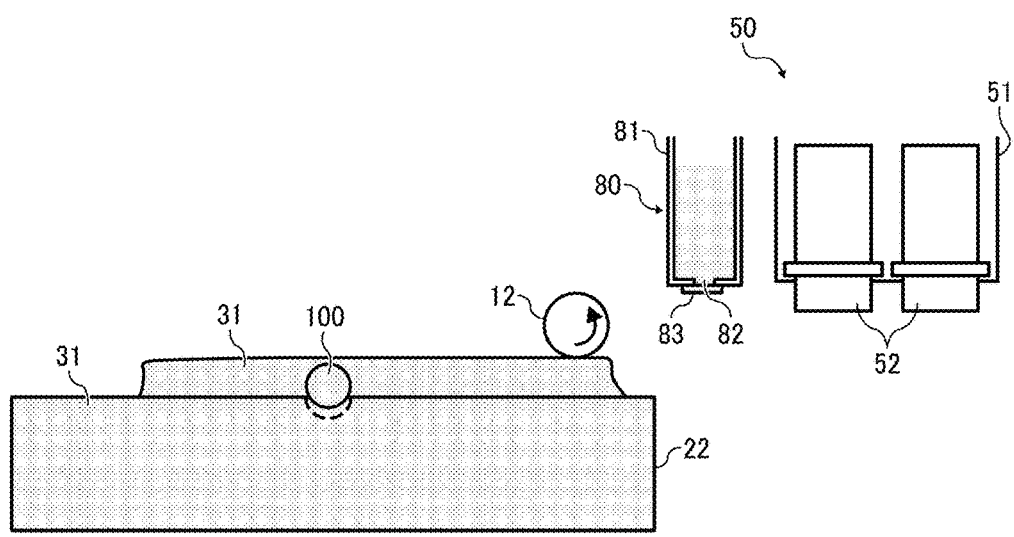

The shutter 83 of the powder supplier 80 is then closed at a predetermined position, as illustrated in FIG. 11B, to prevent a surplus of the powder 20 from flowing out.

By repeating the above-described operation, a stereoscopic modeled product having high uniformity and density can be provided.

In the present embodiment, the flattening roller 12 is moved in conjunction with the movement of the liquid discharge unit 50. Alternatively, the flattening roller 12 can start moving after the modeling operation of one modeling layer is completed.

A second embodiment of the present invention is described below with reference to FIGS. 12A-12B, 13A-13B, 14A-14B, and 15A-15B. FIGS. 12A-12B, 13A-13B, and 14A-14B are plan views for explaining a stereoscopic modeling operation according to the second embodiment. FIGS. 15A-15B are cross-sectional views for explaining the stereoscopic modeling operation according to the second embodiment. FIG. 15A is a cross-sectional view taken from a line A-A of FIG. 12B. FIG. 15B is a cross-sectional view taken from a line B-B of FIG. 13B.

In the present embodiment, the flattening roller 12 is movable in the Y direction that is perpendicular to the X direction.

An opening length L1 that is the length of the supply port 82 of the powder supplier 80 in the Y direction is slightly greater than a length L2 that is the length of the nozzle array 152 of the head 52 in the Y direction. This configuration makes it possible to supply the powder 20 to an area which sufficiently covers the width of a region to which the head 52 can discharge the modeling liquid 10 by one time of scanning. The amount of the powder 20 supplied from the powder supplier 80 is so adjusted that the thickness of the powder layer 31 becomes greater than a predetermined value.

A remover 120 is disposed so as to trail the powder supplier 80. The remover 120 removes and flattens a part of the powder 20 supplied from the powder supplier 80 which has gone beyond a region currently being scanned by the head 52 and into a next region to be scanned by the head 52 in next scanning, with respect to the Y direction. The remover 120 is reciprocatable in the X direction.

The powder supplier 80 and the remover 120 are moved in conjunction with the movement of the carriage 51 (liquid discharge unit 50) in the X1 direction at a predetermined speed.

Figure 12A:
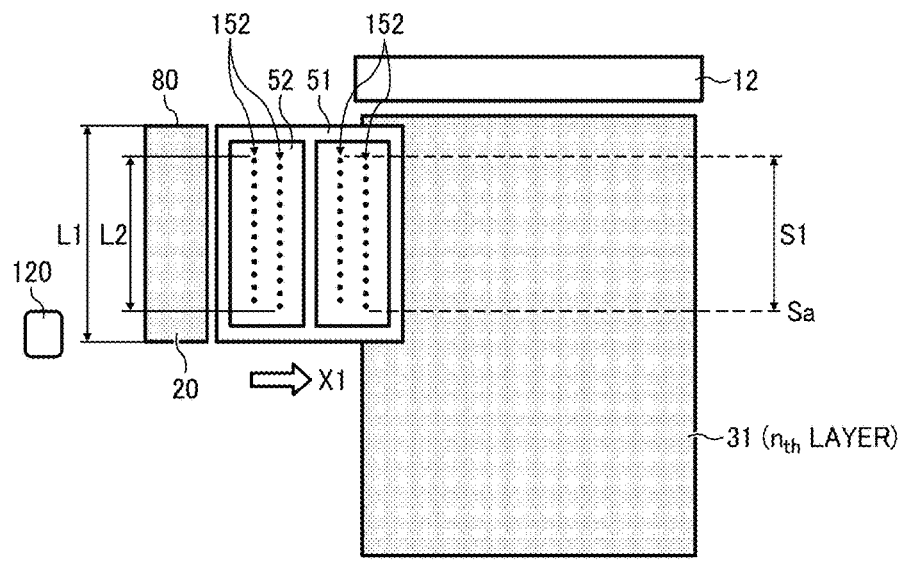
FIGS. 12A and 12B are illustrations for a stereoscopic modeling operation according to another embodiment of the present invention.
Figure 12B:
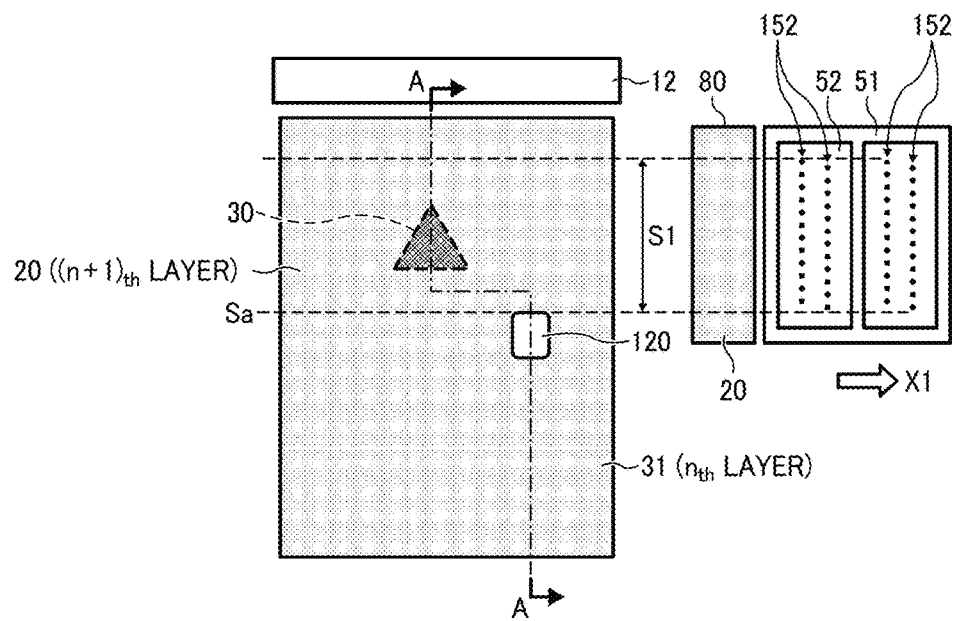

The carriage 51 is moved in the X1 direction, and the head 52 is allowed to discharge the modeling liquid 10 on the $n_{th}$ powder layer 31, as illustrated in FIG. 12A, to form the modeling layer 30 (i.e., layered modeled product), as illustrated in FIG. 12B. A scanning region S1 is defined as a region to which the head 52 can discharge the modeling liquid extending in the Y direction.

At the same time, the powder supplier 80 is also moved moved in the X1 direction trailing the carriage 51 in conjunction with the movement of the carriage 51 (liquid discharge unit 50) while supplying the powder 20 for forming the $(n+1)_{th}$ powder layer 31. In the present embodiment, the powder supplier 80 supplies the powder 20 while a part of the droplet of the modeling liquid 10 adhered to the powder layer 31 remains existing on the surface of the powder layer 31.

The remover 120 is also moved in the X1 direction. As the remover 120 is moved, a part of the powder 20 supplied from the powder supplier 80 which is located beyond a lower-end position Sa of the nozzle array 152 of the head 52 is removed and flattened, as illustrated in FIG. 15A. Thus, in a next scanning region S2, the height of the $n_{th}$ powder layer 31 is maintained.

Figure 13A:
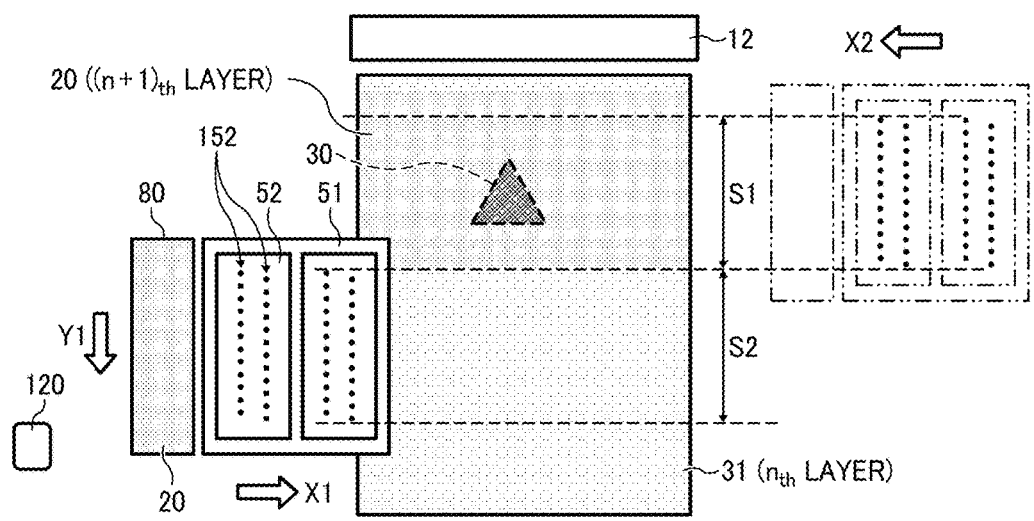
FIGS. 13A and 13B are illustrations for the operation following FIGS. 12A and 12B.

To perform the next scanning, the carriage 51 is returned in the X2 direction, the whole modeling unit 5 is moved in the Y1 direction, and the head 52 is moved to the scanning region S2, as illustrated in FIG. 13A.

Since the surplus powder 20 supplied to next the scanning region S2 has been removed and flattened by the remover 120, as described above, the height of the $n_{th}$ powder layer 31 is maintained in the scanning region S2.

Figure 13B:
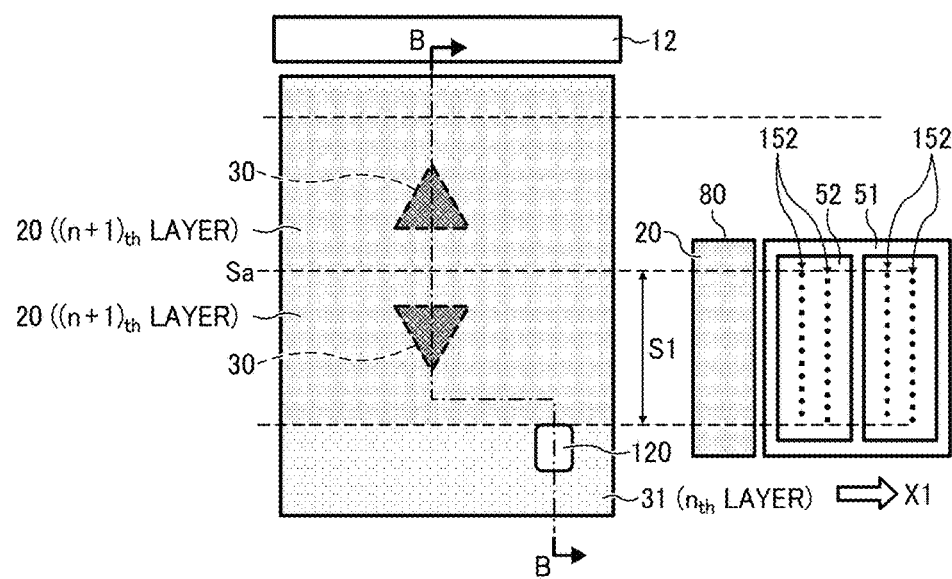

Thus, the carriage 51 is then moved in the X1 direction, and the head 52 is allowed to discharge the modeling liquid 10 on the $n_{th}$ powder layer 31, as illustrated in FIG. 13B, to form the modeling layer 30 (i.e., layered modeled product).

At the same time, the powder supplier 80 is also moved moved in the X1 direction trailing the carriage 51 in conjunction with the movement of the carriage 51 (liquid discharge unit 50) while supplying the powder 20 for forming the $(n+1)_{th}$ powder layer 31.

The remover 120 is also moved in the X1 direction. As the remover 120 is moved, a part of the powder 20 supplied from the powder supplier 80 which is located beyond the lower-end position Sa of the nozzle array 152 of the head 52 is removed and flattened, as illustrated in FIG. 15B. On the other hand, a part of the powder 20 supplied to the scanning region S1 side is accumulated on the powder 20 already supplied to the scanning region S1, as illustrated in FIG. 15B.

Figure 14A:
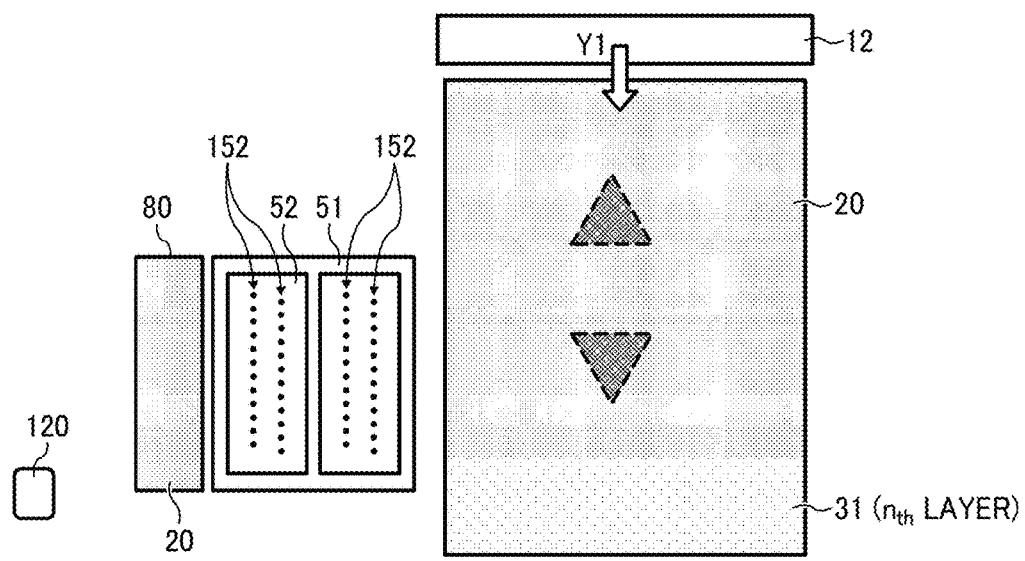
FIGS. 14A and 14B are illustrations for the operation following FIGS. 13A and 13B.
Figure 14B:
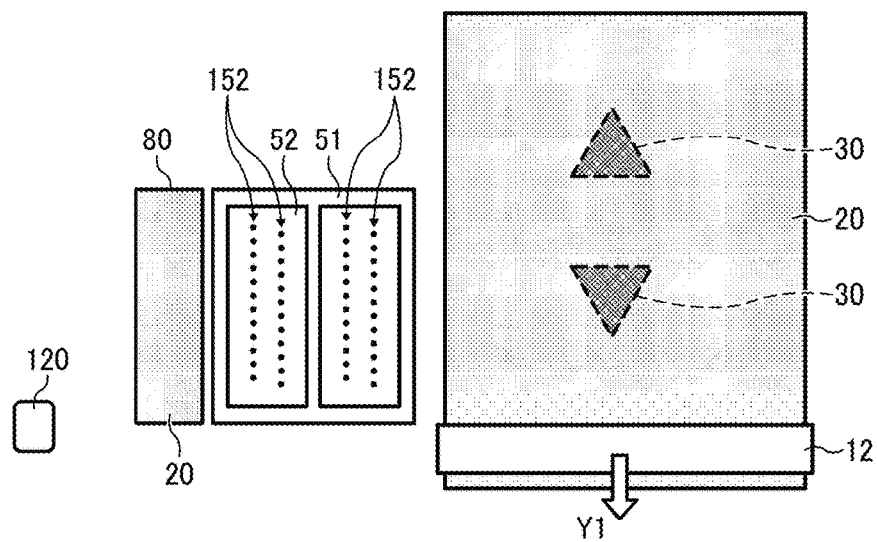
Figure 15A:
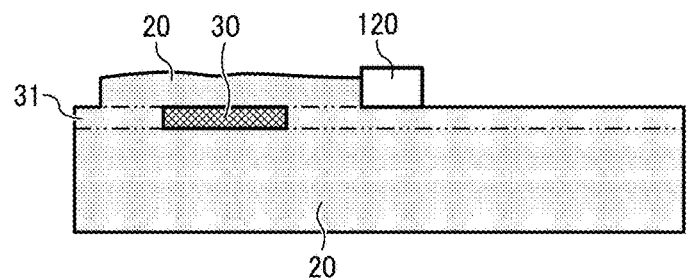
FIGS. 15A and 15B are cross-sectional views for the stereoscopic modeling operation.
Figure 15B:
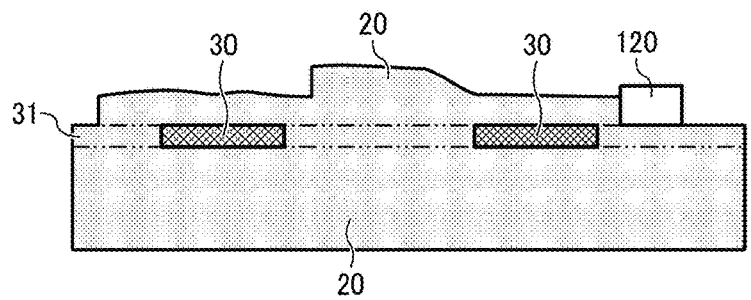

The carriage 51 and the peripheral members are then returned to the initial position, as illustrated in FIG. 14A, and the flattening roller 12 is moved in the Y1 direction to flatten the powder layer 31, as illustrated in FIG. 14B. Owing to this operation, the powder 20 accumulated at the seam of the scanning regions S1 and S2, illustrated in FIG. 15B, are flattened. Thus, the $(n+1)_{th}$ powder layer 31 is formed.

The stereoscopic modeling operation is controlled by the controller 500 and executed based on a program in accordance with an embodiment of the present invention.

It is preferable that the modeling liquid 10 is suppressed from permeating the powder 20 as much as possible by controlling the rate of permeation by varying the contact angle between the powder 20 and the modeling liquid 10.

Figure 16:
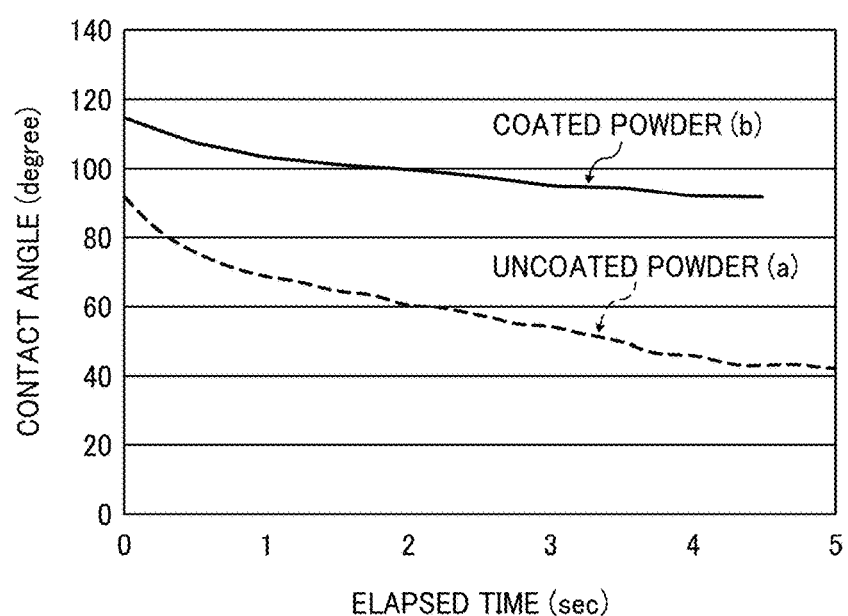
FIG. 16 is a graph showing a measurement result of variation in the contact angle with time.

The static contact angle between a powder and a droplet is described below with reference to FIG. 16. FIG. 16 is a graph showing a measurement result of variation in the contact angle with time.

The rate of permeating the powder layer 31 of the droplet 100 can be visualized and quantified by means of the contact angle between the droplet (of the modeling liquid) and the surface of the powder as follows. Spread the powder on a glass plate to form a thin layer thereof, and drop the droplet on the layer from a needle, while observing the condition with a camera over time, to measure a time variation in the contact angle. The contact angle is measured with an automatic contact angle measuring instrument (DataPhysics OCA200H). As the measurement environment, the temperature is set in the range of 22 to 23° C. and the humidity is set in the range of 45 to 65% RH.

The powder 20 (hereinafter may be simply "powder") used for the stereoscopic modeling in accordance with some embodiments of the present invention is described below.

The powder includes a base material covered with an organic material, and may optionally include other components, if needed. The material covering the base material includes the organic material as a main component, and may optionally include an inorganic material, if needed. The powder is used for a method of manufacturing the stereoscopic modeled product according to an embodiment of the present invention, to be described later.

Base Material

The base material is not limited to a specific material so long as it has the form of a powder or particle. Specific examples of the base material include, but are not limited to, metal, ceramic, carbon, polymer, wood, biocompatible material, and sand. To obtain a high-strength stereoscopic modeled product, metals and ceramics that can be eventually subjected to a sintering process are preferable.

Specific examples of the metal include, but are not limited to, stainless steel (SUS), iron, copper, titanium, and silver. Specific examples of the stainless steel (SUS) include, but are not limited to, SUS316L. Specific examples of the ceramic include, but are not limited to, metal oxides such as silica ($SiO_2$), alumina ($Al_2O_3$), zirconia ($ZrO_2$), and titania ($TiO_2$). Specific examples of the carbon include, but are not limited to, graphite, graphene, carbon nanotube, carbon nanohorn, and fullerene.

Specific examples of the polymer include, but are not limited to, water-insoluble resins. Specific examples of the wood include, but are not limited to, wood chips and celluloses. Specific examples of the biocompatible material include, but are not limited to, polylactic acids and calcium phosphates.

The above-described materials can be used alone or in combination.

Commercially-available particles or powders of the above-described materials can be used as the base material.

Specific examples of commercially-available materials for the base material include, but are not limited to, SUS316L (PSS316L available from Sanyo Special Steel Co., Ltd.), $SiO_2$ (EXCELICA SE-15K available from Tokuyama Corporation), $AlO_2$ (TIMICRON TM-5D available from Taimei Chemicals Co., Ltd.), and $ZrO_2$ (TZ-B53 available from Tosoh Corporation).

For the purpose of enhancing the affinity for the organic material, the base material can be subjected to a surface (modification) treatment.

The base material is not limited in average particle diameter. The average particle diameter is preferably in the range of 0.1 to 500 μm, more preferably 5 to 300 μm, and most preferably 15 to 250 μm.

When the average particle diameter is in the range of 0.1 to 500 μm, the base material provides an excellent stereoscopic modeled product productivity and good operability and handling ability. When the average particle diameter is 500 μm or less, a thin layer of the powder can be improved in powder filling rate, thereby suppressing generation of void areas in the resulting stereoscopic modeled product.

The average particle diameter of the base material can be measured with a known particle size analyzer such as MICROTRAC HRA (available from Nikkiso Co., Ltd.).

The base material is not limited in particle size distribution.

The base material is not limited in outer shape, surface area, circularity, fluidity, and wettability.

Organic Material

The organic material is a substance soluble in the modeling liquid and cross-linkable owing to the action of a cross-linker included in the modeling liquid. The organic material is regarded as being soluble in the modeling liquid when, 1 g of the organic material is mixed and stirred with 100 g of the solvent included in the modeling liquid having a temperature of 30° C., 90% by weight or more of the organic material is dissolved in the modeling liquid.

The 4% (by weight) solution of the organic material preferably has a viscosity of 40 mPa·s or less, more preferably in the range of 1 to 35 mPa·s, and most preferably in the range of 5 to 30 mPa·s, at 20° C.

When the viscosity is 40 mPa·s or less, the resulting cured product (stereoscopic modeled product), composed of the layers formed by adding the modeling liquid to the powder, has an improved strength. The cured product can be subjected to a succeeding process such as sintering, or simply handled, without losing its shape. Additionally, the resulting cured product (stereoscopic modeled product), composed of the layers formed by adding the modeling liquid to the powder, has an improved dimension accuracy. The viscosity can be measured based on a method according to JIS K7117.

The organic material is not limited to a specific substance. In view of handleability and environmental load reduction, preferably, the organic material is water-soluble. Specific examples of the organic material which are water-soluble include, but are not limited to, water-soluble resins and water-soluble prepolymers.

When the powder includes such a water-soluble organic material, the modeling liquid may employ an aqueous medium as its medium. When such a powder is discarded or recycled, the organic material and the base material can be easily separated by a water treatment.

Specific examples of the water-soluble resin include, but are not limited to, polyvinyl alcohol resin, polyacrylic acid resin, cellulose resin, starch, gelatin, vinyl resin, amide resin, imide resin, acrylic resin, and polyethylene glycol.

The water-soluble resin may be either a homopolymer or a heteropolymer (copolymer), may be modified, may have a functional group, and/or may be in the form of a salt, so long as it has water solubility.

Specific examples of the polyvinyl alcohol resin include, but are not limited to, polyvinyl alcohols, modified polyvinyl alcohols (e.g., acetoacetyl-group-modified polyvinyl alcohol, acetyl-group-modified polyvinyl alcohol, silicone-modified polyvinyl alcohol), and butanediol-vinyl alcohol copolymers.

Specific examples of the polyacrylic acid resin include, but are not limited to, polyacrylic acids and polyacrylic acid salts such as sodium polyacrylate. Specific examples of the cellulose resin include, but are not limited to, cellulose and carboxymethyl cellulose (CMC). Specific examples of the acrylic resin include, but are not limited to, polyacrylic acids and acrylic acid-maleic anhydride copolymers.

Specific examples of the water-soluble prepolymers include, but are not limited to, adhesive water-soluble isocyanate prepolymers that may be included in water sealants.

Specific examples of the organic material which are not water-soluble include, but are not limited to: resins such as acrylic resin, maleic acid resin, silicone resin, butyral resin, polyester, polyvinyl acetate, vinyl chloride-vinyl acetate copolymer, polyethylene, polypropylene, polyacetal, ethylene-vinyl acetate copolymer, ethylene-acrylic acid copolymer, ethylene-methacrylic acid copolymer, α-olefin-maleic anhydride copolymer and esterification products thereof, polystyrene, polyacrylate, polymethacrylate, copolymer of α-olefin, maleic anhydride, and a vinyl-group-containing monomer, styrene-maleic anhydride copolymer, styrene-acrylate copolymer, styrene-methacrylate copolymer, polyamide, epoxy resin, xylene resin, ketone resin, petroleum resin, rosin and derivatives thereof, coumarone-indene resin, terpene resin, and polyurethane resin; synthetic rubbers such as styrene-butadiene rubber, polyvinyl butyral, nitrile rubber, acrylic rubber, and ethylene-propylene rubber; and nitrocellulose.

Among the above organic materials, those having a cross-linkable functional group are preferable. The cross-linkable functional group is not limited in configuration. Specific examples of the cross-linkable functional group include, but are not limited to, hydroxyl group, carboxyl group, amide group, phosphoric acid group, thiol group, acetoacetyl group, and ether bond.

Advantageously, the organic material having a cross-linkable functional group easily cross-links to form a hardened product (stereoscopic modeled product).

Among the above organic materials, polyvinyl alcohol resins having an average degree of polymerization in the range of 400 to 1,100 are preferable. In particular, such polyvinyl alcohol resins having a cross-linkable functional group are more preferable. More specifically, such polyvinyl alcohol resins modified with acetoacetyl group are most preferable. Owing to the action of a metal in the cross-linker included in the modeling liquid, the acetoacetyl group in the polyvinyl alcohol resin can easily form a complicated three-dimensional network structure (cross-linking structure) with the metal. In other words, the acetoacetyl group has excellent cross-linking reactivity. The resulting product has excellent flexural strength.

Such acetoacetyl-group-modified polyvinyl alcohol resins, each having different degrees of viscosity and saponification, may be used alone or in combination. In particular, acetoacetyl-group-modified polyvinyl alcohol resins having an average degree of polymerization in the range of 400 to 1,100 are preferable.

The above-described organic materials can be used alone or in combination, and can be either synthetic products or commercially-available products.

Specific examples of commercially-available products for the organic material include, but are not limited to, polyvinyl alcohols (PVA-205C and PVA-220C available from Kuraray Co., Ltd.), a polyacrylic acid (JURYMER® AC-10 available from Toagosei Co., Ltd.), a sodium polyacrylate (JURYMER® AC-103P available from Toagosei Co., Ltd.), acetoacetyl-group-modified polyvinyl alcohols (GOHSENX™ Z-300, GOHSENX™ Z-100, GOHSENX™ Z-200, GOHSENX™ Z-205, GOHSENX™ Z-210, and GOHSENX™ Z-220 available from The Nippon Synthetic Chemical Industry Co., Ltd.), carboxyl-group-modified polyvinyl alcohols (GOHSENX™ T-330, GOHSENX™ T-350, and GOHSENX™ T-330T available from The Nippon Synthetic Chemical Industry Co., Ltd.), a butanediol-vinyl alcohol copolymer (Nichigo G-Polymer™ OKS-8041 available from The Nippon Synthetic Chemical Industry Co., Ltd.), a diacetone-acrylicamide-modified polyvinyl alcohol (DF-05 available from Japan Vam & Poval Co., Ltd.), a sodium carboxymethyl cellulose (CELLOGEN® 5A and CELLOGENO 6A available from DKS Co., Ltd.), a starch (PSS-5 available from Sanwa Starch Co., Ltd.), and a gelatin (beMatrix® gelatin available from Nitta Gelatin Inc.).

The average thickness of the organic material covering the base material is preferably in the range of 5 to 1,000 nm, more preferably 5 to 500 nm, much more preferably 50 to 300 nm, and most preferably 100 to 200 nm.

According to the present embodiment, the thickness of the covering layer can be smaller than that of conventional powders owing to the curing action of the cross-linker. The covering layer has a good balance of strength and accuracy even when being thin.

When the average thickness of the covering layer is 5 nm or more, the resulting cured product (stereoscopic modeled product), composed of the layers formed by adding the modeling liquid to the powder, has an improved strength. The cured product can be subjected to a succeeding process such as sintering, or simply handled, without losing its shape. When the average thickness of the covering layer is 1,000 nm or less, the resulting cured product (stereoscopic modeled product), composed of the layers formed by adding the modeling liquid to the powder, has an improved dimension accuracy.

The average thickness can be measured by, for example, embedding the powder in an acrylic resin or the like resin, exposing a surface of the base material by means of etching or the like, and observing the surface with a scanning tunneling microscope (STM), atomic force microscope (AFM), scanning electron microscope (SEM), or the like microscope.

The coverage (area ratio) of the organic material on the surface of the base material is preferably 15% or more, more preferably 50% or more, and most preferably 80% or more.

When the coverage is 15% or more, the resulting cured product (stereoscopic modeled product), composed of the layers formed by adding the modeling liquid to the powder, has an improved strength. The cured product can be subjected to a succeeding process such as sintering, or simply handled, without losing its shape. Additionally, when the coverage is 15% or more, the resulting cured product (stereoscopic modeled product), composed of the layers formed by adding the modeling liquid to the powder, has an improved dimension accuracy.

The coverage can be determined by, for example, observing a photograph of the powder, calculating the area ratio (%) of portions covered with the organic material to the whole surface of each powder particle in a two-dimensional plane in the photograph, and averaging the calculated area ratios. Portions covered with the organic material can be detected by means of elemental mapping, performed by energy dispersive X-ray spectrometry such as SEM-EDS.

Other Components

The powder may include other components, such as a fluidizer, a tiller, a leveling agent, and a sintering auxiliary agent, if needed.

The powder including a fluidizer is advantageous in that the powder layers can be easily and efficiently formed. The powder including a filler is advantageous in that the resulting cured product (stereoscopic modeled product) is likely to contain few void areas. The powder including a leveling agent is advantageous in that the powder has an improved wettability and handleability. The powder including a sintering auxiliary agent is advantageous in that the resulting cured product (stereoscopic modeled product) can be sintered at lower temperatures.

Production of Powder

A method of producing the powder is not limited to any specific method. The powder can be produced by, for example, covering the base material with the organic material by a known covering method. The covering method is not limited to any specific method.

Specific examples of the covering method include, but are not limited to, roll fluidizing coating methods, spray drying methods, stirring mixing adding methods, dipping methods, and kneader coating methods. Such covering methods can be performed by various commercially-available coaters or granulators.

Properties of Powder

The powder is not limited in average particle diameter. The average particle diameter of the powder is preferably in the range of 3 to 250 μm, more preferably 3 to 200 μm, much more preferably 5 to 150 μm, and most preferably 10 to 85 μm.

When the average particle diameter of the powder is 3 μm or more, the fluidity of the powder is improved. Thus, the powder layer can be easily formed and the surfaces of the laminating layers become smooth. This leads to improvements in productivity, handleability, and dimension accuracy of the resulting stereoscopic modeled product.

When the average particle diameter of the powder is 250 μm or less, the space between the powder particles becomes small, thus reducing the void ratio in the resulting stereoscopic modeled product and improving the strength of the stereoscopic modeled product. Accordingly, when the average particle diameter is in the range of 3 to 250 μm, dimension accuracy and strength can achieve a good balance.

The powder is not limited in particle size distribution.

The powder preferably has an angle of repose of 60 degrees or less, more preferably 50 degrees or less, and most preferably 40 degrees or less. When the angle of repose is 60 degrees or less, the powder can be efficiently and stably placed on a desired position a substrate. The angle of repose can be measured with a powder properties measuring instrument (e.g., Powder Characteristics Tester PT-N available from Hosokawa Micron Corporation).

The modeling liquid in accordance with an embodiment of the present invention is described below.

The modeling liquid includes a cross-linker that is cross-linkable with the organic material. The modeling liquid further includes a medium (solvent) that dissolves the organic material, a component that accelerates the dissolution, and a stabilizer that keeps storage stability of the modeling liquid. The modeling liquid may further include other components, if needed.

Upon addition of the modeling liquid to the organic material, the organic material dissolves therein, and at the same time, cross-links by the action of the cross-linker included in the modeling liquid.

The modeling liquid preferably has a viscosity of 25 mPa·s or less, more preferably in the range of 3 to 20 mPa·s, at 25° C. When the viscosity is 25 mPa·s or less at 25° C., the modeling liquid can be reliably discharged.

It is preferable that, after the modeling liquid is left at rest for three days at 50° C., the change rate in viscosity of the modeling liquid is less than 20%. When the change rate in viscosity of the modeling liquid is 20% or more, the modeling liquid may be discharged unstably.

Medium

The medium is not limited to a specific substance so long as it is capable of dissolving the organic material that is covering the base material of the powder. Specific examples of the medium include, but are not limited to: hydrophilic media such as water, alcohols such as ethanol, ethers, and ketones; aliphatic hydrocarbons; ether solvents such as glycol ether; ester solvents such as ethyl acetate; ketone solvents such as methyl ethyl ketone; and higher alcohols.

In view of environmental load reduction and discharge stability (a smaller time variation in viscosity) of the modeling liquid, aqueous media are preferable, and water is most preferable. The aqueous medium may be a mixture of water and a slight amount of an aqueous component other than water such as an alcohol. In the case where the modeling liquid includes an aqueous medium as the medium, the organic material preferably includes a water-soluble organic material as a main component.

Specific examples of the hydrophilic media include, but are not limited to, water, alcohols such as ethanol, ethers, and ketones.

Cross-Linker

The cross-linker is not limited to any specific substance so long as it is capable of cross-linking with the organic material. Specific examples of the cross-linker include, but are not limited to, metal salts, metal complexes, organic zirconium compounds, organic titanium compounds, and chelate agents.

Specific examples of the organic zirconium compounds include, but are not limited to, zirconium oxychloride, ammonium zirconium carbonate, and ammonium zirconium lactate.

Specific examples of the organic titanium compounds include, but are not limited to, titanium acylate and titanium alkoxide.

The above-described materials can be used alone or in combination. Among the above-described materials, metal salts are most preferable.

Specific examples of the metal salts include, but are not limited to, those generating a cationic metal having 2 or more valences in water by electrolytic dissociation. Specific examples of such metal salts include, but are not limited to, zirconium oxychloride octahydrate (4 valences), aluminum hydroxide (3 valences), magnesium hydroxide (2 valences), titanium lactate ammonium salt (4 valences), basic aluminum acetate (3 valences), zirconium carbonate ammonium salt (4 valences), and triethanolamine titanate (4 valences).

Commercially-available metal salts can also be used. Specific examples of commercially-available metal salts include, but are not limited to, a zirconium oxychloride octahydrate (zirconium oxychloride available from Daiichi Kigenso Kagaku Kogyo Co., Ltd.), an aluminum hydroxide (available from Wako Pure Chemical Industries, Ltd.), a magnesium hydroxide (available from Wako Pure Chemical Industries, Ltd.), a titanium lactate ammonium salt (ORGATIX TC-300 available from Matsumoto Fine Chemical Co., Ltd.), a zirconium lactate ammonium salt (ORGATIX ZC-300 available from Matsumoto Fine Chemical Co., Ltd.), a basic aluminum acetate (available from Wako Pure Chemical Industries, Ltd.), a bisvinylsulfone compound (VS-B(K-FJC) available from FUJIFILM Finechemicals Co., Ltd.), a zirconium carbonate ammonium salt (Zircosol AC-20 available from Daiichi Kigenso Kagaku Kogyo Co., Ltd.), and a triethanolamine titanate (ORGATIX TC-400 available from Matsumoto Fine Chemical Co., Ltd.).

Among the above compounds, zirconium carbonate ammonium salt is most referable since it provides the resulting stereoscopic modeled product with excellent strength.

Surfactant

The modeling liquid may include a surfactant for the purpose of adjusting the surface tension.

Specific examples of the surfactant include, but are not limited to, anionic surfactants, nonionic surfactants, and ampholytic surfactants.

A suitable surfactant is so selected that the dispersion stability is not degraded depending on the combination of wetting agent and water-soluble organic solvent.

The effect of the cross-linker according the present embodiment is described below with reference to FIG. 21.

Figure 21:
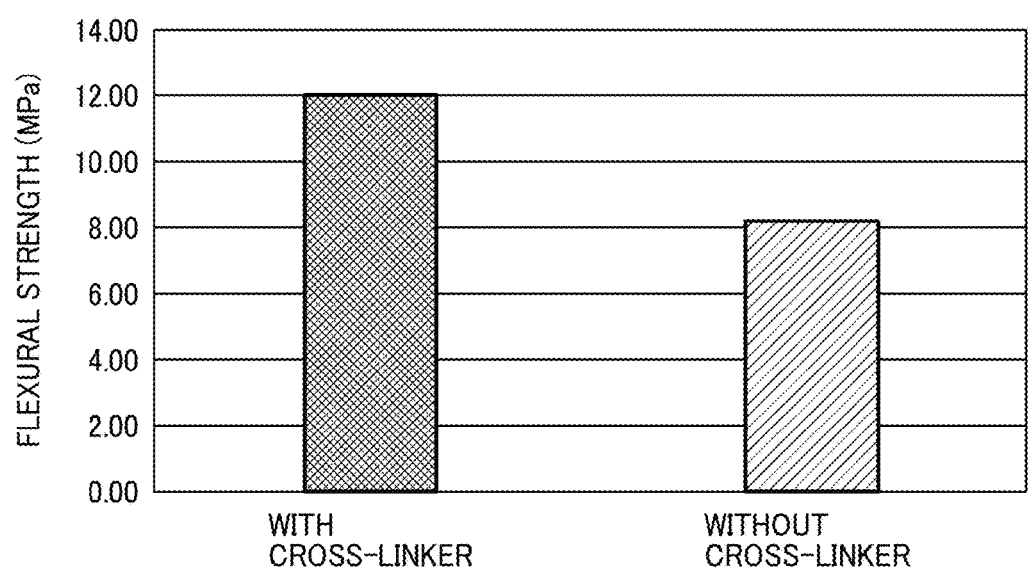
FIG. 21 is a graph showing the effect of a cross-linker on the quality of a modeled product.

FIG. 21 is a graph showing three-point flexural strength of modeled products each having a length of 70 mm, a width of 10 mm, and a thickness of 3 mm. The flexural strength is measured with a Precision Universal Tester AG-1, available from Shimadzu Corporation, using a 1-kN load cell.

A stainless steel powder (gas-atomized powder PSS316L-20 μm grade, available from Sanyo Special Steel Co., Ltd.) is used as the base material, Z100 is used as the organic material covering the base material, and Zircosol AC-20 is used as the cross-linker. By using the cross-linker, the flexural strength is increased from 8.3 MPa to 11.9 MPa, i.e., by approximately 43%.

In this flexural test, for the purpose of directly evaluating the effect of materials, the modeled products are formed as follows, not by means of powder additive manufacturing: kneading the mixture of the above materials at a predetermined ratio to prepare a slurry, pouring the slurry into a silicone mold, and drying and solidifying the slurry at 100° C. for 2 hours.

On the other hand, another three-point flexural test is conducted in the same manner to evaluate modeled products prepared by means of powder additive manufacturing each having a length of 35 mm, a width of 10 mm, and a thickness of 3 mm. As a result, by using the cross-linker, the flexural strength is increased from 1.62 MPa to 3.5 MPa, i.e., becomes twice. The additive manufacturing conditions are set as follows: a single layer thickness is 102 μm, the manufacturing resolution is 300×300 dpi, and the modeling liquid amount is 180 pl/dot.

Referring back to FIG. 16, an uncoated powder (a) is constantly having high contact angles, including the initial static contact angle, than a coated powder (b). This indicates that the rate of permeating the powder layer 31 of the modeling liquid droplet can be controlled by reforming the surface of the powder or adjusting the properties of the modeling liquid. In particular, the contact angle becomes higher in the case where the powder is coated with the organic material and the modeling liquid is aqueous.

Next, how the contact angle between the powder and the droplet effects on the density of the modeled product is described below with reference to FIG. 17.

Figure 17A:
FIGS. 17A and 17B are transmission X-ray images of products modeled with various powders.
Figure 17B:
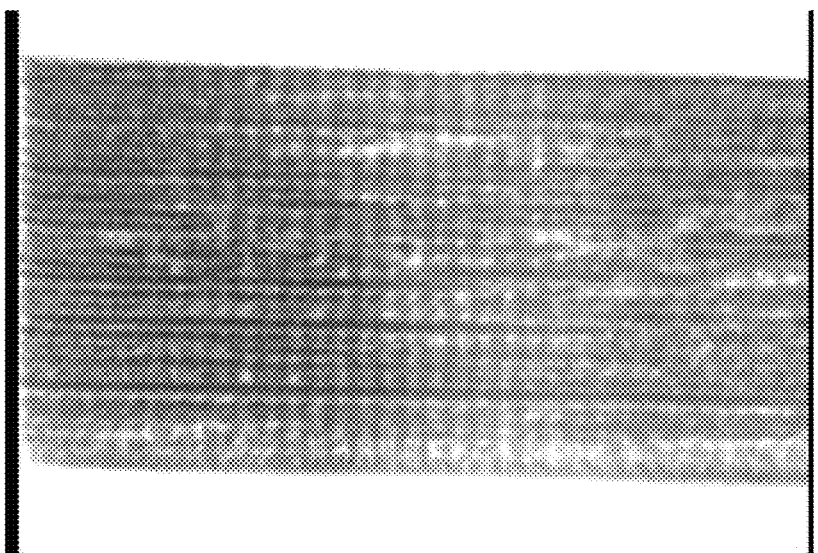

FIG. 17A is a transmission X-ray image of a product modeled with a powder having a large (high) contact angle (e.g., the coated powder (b) illustrated in FIG. 16). FIG. 17B is a transmission X-ray image of a product modeled with a powder having a small (low) contact angle (e.g., the uncoated powder (a) illustrated in FIG. 16).

In these transmission X-ray images, the darker color indicates the higher density.

The image of FIG. 17A is uniform. On the other hand, the image of FIG. 17B has white portions that indicating the presence of scattered voids. The gap between the layers is narrower and less visible in FIG. 17A.

When obtaining the modeled product of FIG. 17A, SUS316L (PSS316L—20 μm or less grade, available from Sanyo Special Steel Co., Ltd.) is used as the base material of the powder, DF05 is used as the coating resin for the base material, and 1,2-propanediol is used as the organic solvent in the modeling liquid.

These results indicate that the contact angle between the powder and the droplet exerts an influence on the density of the modeled product.

A third embodiment of the present invention is described below with reference to FIGS. 18A to 18E. FIGS. 18A to 18E are illustrations for explaining the third embodiment.

In the present embodiment, while a part of the droplet 100 is remaining on the surface of the powder layer 31 and the rest of the droplet 100 is permeating the powder layer 31, the powder 20 for forming a next powder layer 31 is supplied. In other words, while a part of the modeling liquid 10 adhered to the surface of the powder layer 31 remains existing on the outermost surface of the powder layer 31, the powder 20 for forming a next powder layer 31 is supplied.

Figure 18A:
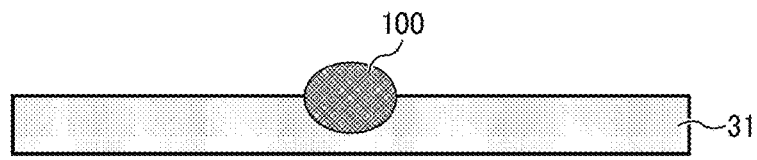
FIGS. 18A to 18E are illustrations for a stereoscopic modeling operation according to an embodiment of the present invention.
Figure 18B:
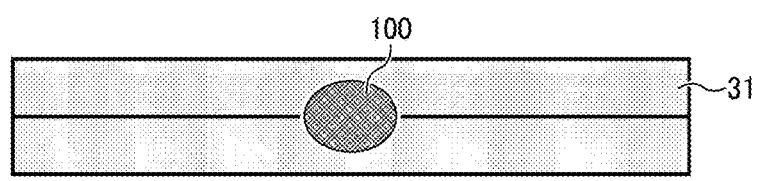

For example, while a half of the droplet 100 of the modeling liquid 10 is remaining on the surface of the powder layer 31 and the other half of the droplet 100 is permeating the powder layer 31, as illustrated in FIG. 18A, the powder 20 for forming a next powder layer 31 is supplied and flattened to become a state illustrated in FIG. 18B.

Since the droplet 100 (modeling liquid 10) is present inside the powder layer 31 (powder 20), particles of the powder 20 are moved by liquid bridge adhesive force and become sparse at the boundary of the droplet 100 (modeling liquid 10) and the powder layer 31 (powder 20). This phenomenon is indicated in FIGS. 18A to 18E by white portions surrounding the droplet 100.

Figure 18C:
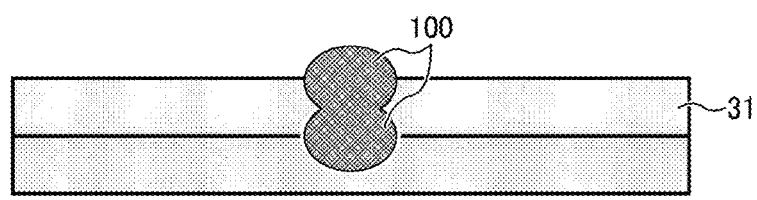
Figure 18D:
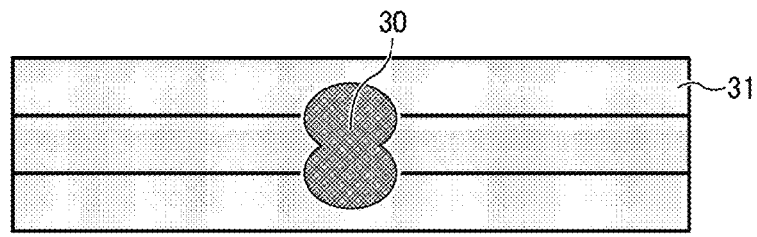
Figure 18E:
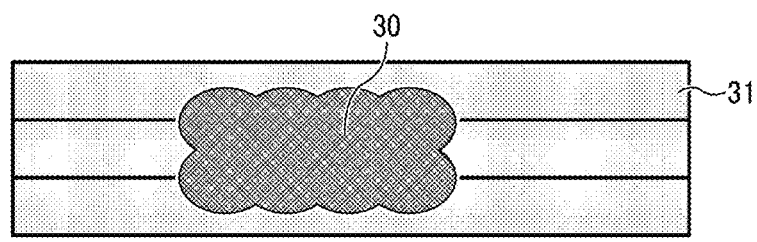
Figure 19A:
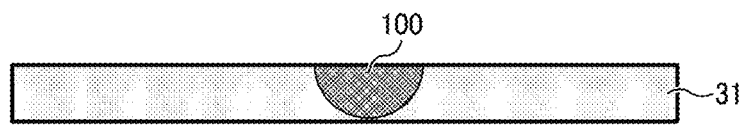
FIGS. 19A to 19E are illustrations for a stereoscopic modeling operation according to a comparative example.
Figure 19B:
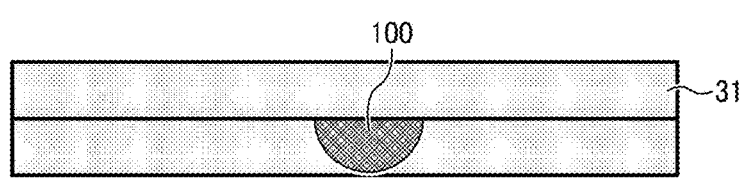
Figure 19C:
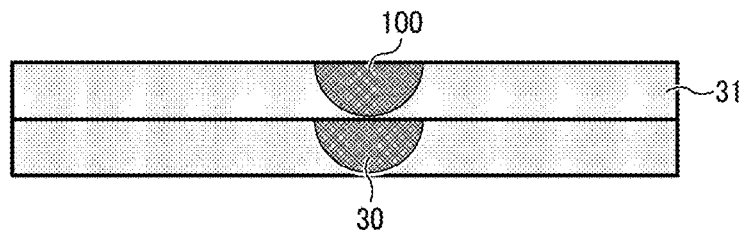
Figure 19D:
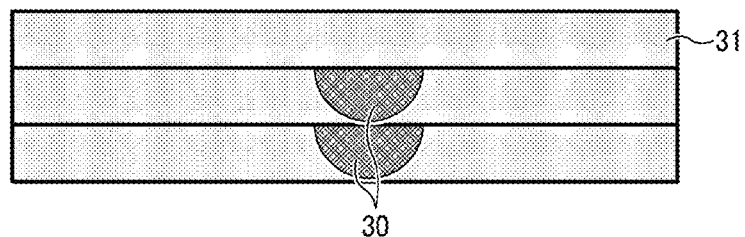
Figure 19E:
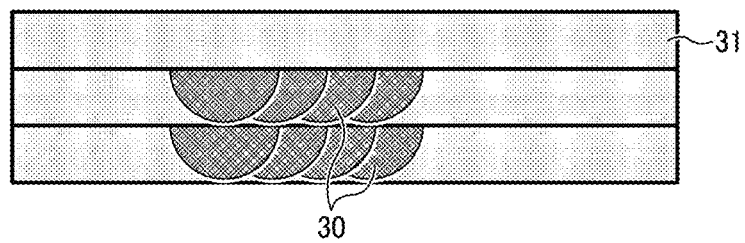

As another droplet 100 impacts on the powder layer 31, as illustrated in FIG. 18C, to form a new powder layer 31, as illustrated in FIG. 18D, the droplet 100 coalesces with the previously-impacted droplet 100 and a force that releases liquid bridge adhesive force is acquired. As a result, particles of the powder 20 cross-link with each other within a large area of the coalesced droplet 100 to become the modeling layer 30. By expanding this discharging operation of the droplet 100 in the planar direction, the modeling layer 30 illustrated in FIG. 18E can be obtained.

When the powder 20 for forming a next powder layer 31 is supplied while a part of the modeling liquid 10 adhered to the surface of the powder layer 31 is existing thereon, a stereoscopic modeled product having uniformity and a high density can be obtained without generating voids.

A comparative example is described below with reference to FIGS. 19A to 19E.

In this comparative example illustrated in FIGS. 19A to 19E, the powder 20 for forming a next powder layer 31 is supplied while all part of the droplet 100 impacted on the powder layer 31 is permeating the powder layer 31. In this case, the droplets 100 in the respective laminated powder layers 31 are hard to coalesce with one another. Therefore, voids generated due to the movement of the particles of the powder by liquid bridge adhesive force and will remain between the modeling layers 30.

Making the droplets 100 coalesce with one another by means of increasing the volume of the droplets 100 may cause a deterioration of the resulting modeled product in accuracy.

In accordance with some embodiments of the present invention, the density of the modeled product can be improved by reducing the remaining voids while maintaining the accuracy.

A stereoscopic modeling apparatus in accordance with another embodiment of the present invention is described below with reference to FIGS. 20A to 20D. FIGS. 20A to 20D are schematic views illustrating a flow of a modeling operation of a stereoscopic modeling apparatus according to an embodiment of the present invention.

In this stereoscopic modeling apparatus, the modeling part 1 includes a powder tank 11. The powder tank 11 includes a supplying tank 21 to supply the powder 20 and the modeling tank 22 in which a plurality of the modeling layer 30 is laminated to form a stereoscopic modeled product. A bottom part of the supplying tank 21 is freely movable up and down in the vertical direction (height direction) as a supplying stage 23.

Figure 20A:
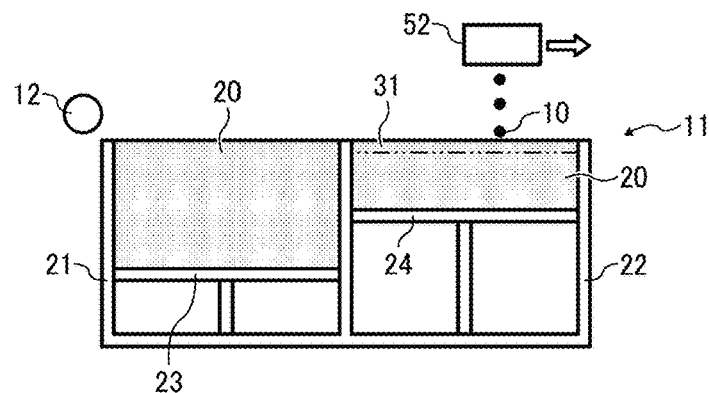
FIGS. 20A to 20D are schematic views illustrating a flow of a modeling operation of a stereoscopic modeling apparatus according to another embodiment of the present invention.
Figure 20B:
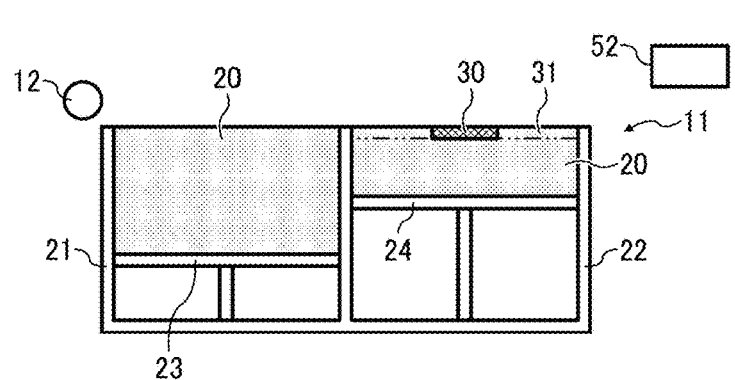

In this stereoscopic modeling apparatus, the head 52 discharges the modeling liquid 10 to the powder layer 31 spread on the modeling stage 24 of the modeling tank 22 while moving, as illustrated in FIG. 20A, to form the first modeling layer 30 in a required shape, as illustrated in FIG. 20B.

Figure 20C:
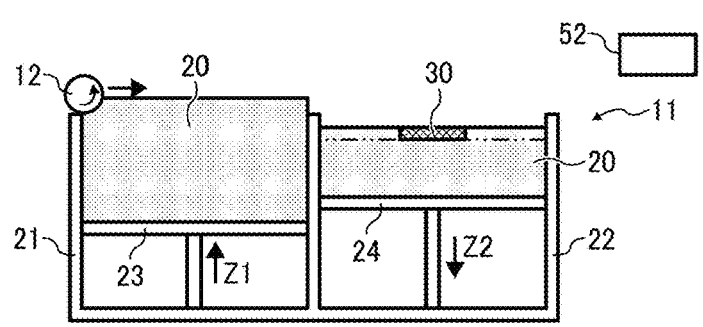
Figure 20D:
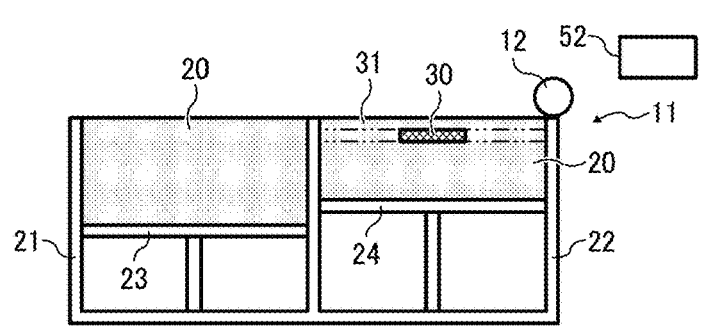

The supplying stage 23 is lifted up in the Z1 direction and the modeling stage 24 is lowered in the Z2 direction for a predetermined distance, as illustrated in FIG. 20C. The flattening roller 12 is then moved from the supplying tank 21 side to the modeling tank 22 side while being rotated, to supply the powder 20 in the supplying tank 21 to the modeling tank 22 and flatten the supplied powder 20 to form a next powder layer 31.

A modeled product in which the modeling layers are laminated is obtained by repeating this operation.

According to an embodiment of the present invention, a stereoscopic modeling apparatus having two tanks is provided. In this apparatus, the powder 20 for forming a next powder layer 31 is supplied while at least a part of the droplet of the modeling liquid 10 adhered to the powder layer 31 remains existing on the surface of the powder layer 31.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A stereoscopic modeling apparatus, comprising:
a modeling tank, in which a powder layer including a powder is formable and in which a modeling layer, in which the powder in the powder layer is bonded into a required shape, is laminateable;
a liquid discharger to discharge a modeling liquid to the powder in the modeling tank; and
a powder supplier to supply the powder to the modeling tank;
at least one processor, configured to control the powder supplier to supply the powder to the powder layer for creation of a next powder layer, while at least a part of the modeling liquid, upon being discharged from the liquid discharger and adhered to a surface of the powder layer, remains existing on an outermost surface of the powder layer; and
a flattening member to flatten the powder, supplied from the powder supplier to the modeling tank, to form the powder layer, wherein the at least a part of the modeling liquid is a droplet and wherein the at least one processor is configured to adjust a height of the flattening member, relative to the powder supplied, so that the flattening member is slightly passable above the droplet.

2. The stereoscopic modeling apparatus of claim 1, wherein the at least one processor is configure to control the liquid discharger to move relative to the modeling tank, and wherein the at least one processor is configure to control the powder supplier discharger to move along with the liquid discharger.

3. The stereoscopic modeling apparatus of claim 2, further comprising:
a remover to remove a part of the powder, supplied from the powder supplier to the modeling tank, which has gone beyond a maximum dischargeable region, to which the at least one processor is configured to control the liquid discharger to discharge the modeling liquid by one time of scanning, and into a next scanning region to which the modeling liquid is to be adhered in a next scanning.

4. The stereoscopic modeling apparatus of claim 1, wherein the flattening member is movable in conjunction with the liquid discharger.

5. The stereoscopic modeling apparatus of claim 1, wherein the powder includes:
a base material; and
an organic material covering the base material.

6. The stereoscopic modeling apparatus of claim 5, wherein the modeling liquid includes a cross-linker to cross-link the organic material.

7. The stereoscopic modeling apparatus of claim wherein the at least one processor is configured to control the flattening member to move relative to the powder supplied in a direction while rotating in a counter direction relative to the direction, to flatten the powder supplied.

8. The stereoscopic modeling apparatus of claim 7, wherein the at least a part of the modeling liquid is a droplet and wherein the at least one processor is configured to control the powder supplier to supply the powder to the powder layer, for creation of a next powder layer, before the droplet fully permeates the powder layer.

9. The stereoscopic modeling apparatus of claim 1, wherein the at least a part of the modeling liquid is a droplet and wherein the at least one processor is configured to control the powder supplier to supply the powder to the powder layer, for creation of a next powder layer, before the droplet fully permeates the powder layer.

* * * * *